United States Patent
Bouzit et al.

(10) Patent No.: US 7,138,976 B1
(45) Date of Patent: Nov. 21, 2006

(54) HAND FORCE FEEDBACK AND SENSING SYSTEM

(75) Inventors: Mourad Bouzit, Edison, NJ (US); Grigore C. Burdea, Highland Park, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 415 days.

(21) Appl. No.: 10/332,661

(22) PCT Filed: Jul. 13, 2000

(86) PCT No.: PCT/US00/19137

§ 371 (c)(1),
(2), (4) Date: May 9, 2003

(87) PCT Pub. No.: WO02/07143

PCT Pub. Date: Jan. 24, 2002

(51) Int. Cl.
*G09G 5/00* (2006.01)
(52) U.S. Cl. .......................................... 345/156; 414/5
(58) Field of Classification Search ........ 345/156–158; 414/5
See application file for complete search history.

(56) References Cited

U.S. PATENT DOCUMENTS

| | | | | |
|---|---|---|---|---|
| 4,834,761 A | * | 5/1989 | Walters | 623/26 |
| 4,988,981 A | * | 1/1991 | Zimmerman et al. | 345/158 |
| 5,004,391 A | | 4/1991 | Burdea | |
| 5,143,505 A | | 9/1992 | Burdea et al. | |
| 5,201,838 A | | 4/1993 | Roudaut | |
| 5,354,162 A | * | 10/1994 | Burdea et al. | 414/5 |
| 5,583,478 A | | 12/1996 | Renzi | |
| 5,709,219 A | | 1/1998 | Chen et al. | |
| 5,721,566 A | | 2/1998 | Rosenberg et al. | |
| 5,853,210 A | * | 12/1998 | Robinson | 294/25 |
| 5,898,599 A | | 4/1999 | Massie et al. | |
| 5,999,168 A | | 12/1999 | Rosenberg et al. | |
| 6,028,593 A | | 2/2000 | Rosenberg et al. | |
| 6,046,727 A | | 4/2000 | Rosenberg et al. | |

* cited by examiner

*Primary Examiner*—Sumati Lefkowitz
*Assistant Examiner*—Rodney Amadiz
(74) *Attorney, Agent, or Firm*—Mathews, Shepherd, McKay & Bruneau, P.A.

(57) ABSTRACT

The present invention relates to a force feedback and sensing system for a hand in which an actuator system and sensing system is coupled to a palm base attached to the hand or a glove. The actuator system includes double acting actuators which provide force feedback against digits of the hand to simulate a real experience a user would have if directly manipulating a real object. The actuators are rotatably mounted to the palm base through a two degrees of freedom rotation joint.

33 Claims, 21 Drawing Sheets

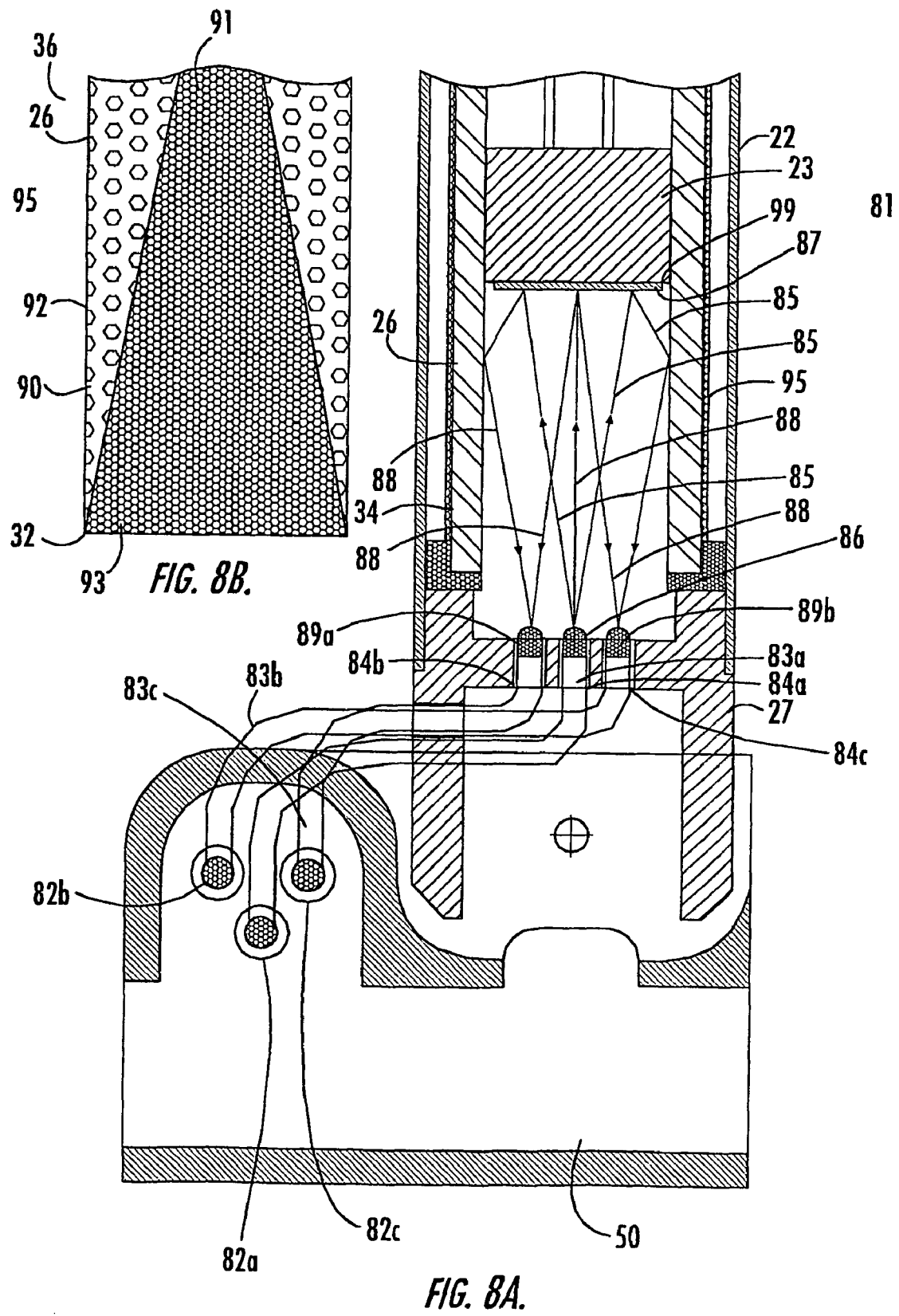

HAND FORCE FEEDBACK AND SENSING SYSTEM

BACKGROUND OF THE INVENTION

1. Field of the Invention

The present invention relates to a force feedback and sensing system for the hand for providing an interface to an interactive system.

2. Description of the Related Art

Force feedback human interface devices are used to track a user's manual gestures and provide means of presenting physical sensations back to the user. A force feedback device typically includes sensors for tracking a user's motions and actuators for producing physical forces.

Conventional systems have used the human hand to control both non-dextrous and dextrous slave devices. U.S. Pat. No. 5,004,391 ('391) issued to one of the inventors of the present disclosure describes a compact, hand-held unit that fits within the space defined by the user's palm and fingers and functions as a position controller for a robot having a slave hand. A finger position sensor including a linear, variable differential transformer provides an output signal that is proportional to the distance between the user's fingers. A force feedback system, including a pneumatic micro-actuator, senses the forces exerted by the end effectors of the robot hand and causes a corresponding force to be exerted on the user's fingers. The foregoing invention was intended primarily for use between the thumb and middle finger of the operator's hand. As such, it limited the ability to provide force feedback between any other fingers of the hand and also required the usage of a special sensor system using a linear differential transformer between the two manipulating digits.

U.S. Pat. No. 5,354,162 issued to one of the inventors of the present disclosure describes an improvement over the '391 patent in which a sensor glove is combined with a force feedback system. An actuator system provides force feedback to a master support. A first, second, third and fourth digit supports are connectable by a finger mount to the thumb, index, middle, and ring digits, respectively. First, second, third and fourth actuators comprising pneumatic cylinders extend between the first, second, third and fourth finger mounts and an "L" shaped palm support mountable on the palm of the glove. Sensors are mounted to the pneumatic cylinders to provide electrical signals on the positioning of the fingers. The signals are forwarded by a stand alone electronic interface to a host computer. The host computer computes the positioning of the finger and provides feedback to the first, second, third and fourth actuators.

U.S. Pat. No. 6,028,593 describes a method and apparatus for providing force feedback to a user operating a human/computer interface device and interacting with a computer generated simulation. In one aspect, a computer-implemented method simulates the interaction of simulated objects displayed to a user who controls one of the simulated objects by manipulating a physical object of an interface device. The position of the simulated object, as provided within the simulation and as displayed, is mapped directly to the physical position of the user object. The apparatus provides force feedback to the user which imparts a physical sensation corresponding to the interaction of the simulated objects.

Sensorial modalities have been used to increase simulation realism during virtual object manipulation. Haptic gloves have been used as haptic interfaces. Examples of haptic gloves have been described as the "Rutgers Master" in Gomez, et al., "Integration of the Rutgers Master II in a Virtual Reality Simulation," IEEE Virtual Reality Annual International Symposium, pp. 198–202, (1995), as the "LRP Glove" in M. Bouzit, "Design, Implementation and Testing of a Data Glove with Force Feedback for Virtual and Real Objects Telemanipulation," Ph.D. Thesis, Paris, France, (1996), as the "CyberGrasp" in Turner, et al., "Preliminary Tests of an Arm-Grounded Haptic Feedback Device in Telemanipulation," Winter Annual Meeting of ASME'98, TX, DSC-Vol. 64, pp. 145–149, Nov. 15–21, Dallas, (1998). Force feedback bandwidth for these devices is in the range of 10–50 Hz. The gloves have one or more force degrees of freedom (DOF) per finger with forces grounded in the palm or on the back of the hand. A virtual hand maps the user's hand to a virtual environment.

It is desirable to provide an improved hand force feedback and sensing system that is lightweight and yet powerful. It is also desirable to have a system that adapts to various hand sizes.

SUMMARY OF THE INVENTION

The present invention relates to a force feedback and sensing system for a hand in which an actuator system and sensing system is coupled to a palm base attached to the hand or a glove. The actuator system includes double acting actuators which provide force feedback against digits of the hand to simulate a real experience a user would have if directly manipulating a real object. The actuators are mounted to the palm base through a two-degrees-of-freedom rotation joint. Preferably, the mount to the palm base includes a miniature bearing for reducing friction.

The system is compact and lightweight to prevent tiring of a user's hand during use. The shape of the palm base provides complete flexion of the metacarpal phalanx and is comfortable in a user's hand. Air tubing to the actuator is preferably coupled directly or integrated with the palm base to allow for full range of motion of the actuators.

Each actuator includes a piston moveable in a cylinder. A piston rod is mounted to the piston. The piston rod is extended and compressed within the cylinder. A self-locking fingertip mount can be used to attach the actuators to the bottom surface of a fingertip. The fingertip mount is mounted on the piston rod through a rotary joint.

The sensing system can comprise one or more of a linear sensor, an abduction angular sensor, a flexion angular sensor and a force sensor. The linear sensor can include a reflective infrared sensor which is activated by receipt of transmitted infrared waves which are reflected from a mirror attached to a bottom surface of the piston. The abduction angular sensor and flexion angular sensor can measure respective motions based on measurement of a magnetic field on two perpendicular axes. The force sensor can include a strain gauge for measurement of deformation of the palm base due to pressure applied by the fingertips.

The invention is described in more detail by reference to the following drawings.

BRIEF DESCRIPTION OF THE DRAWINGS

FIG. 8A is a sectional view of a linear sensor used in the system.

FIG. 8B is a schematic diagram of a portion of a cover for a cylinder used with the linear sensor shown in FIG. 8A.

DETAILED DESCRIPTION

Figure 1A:
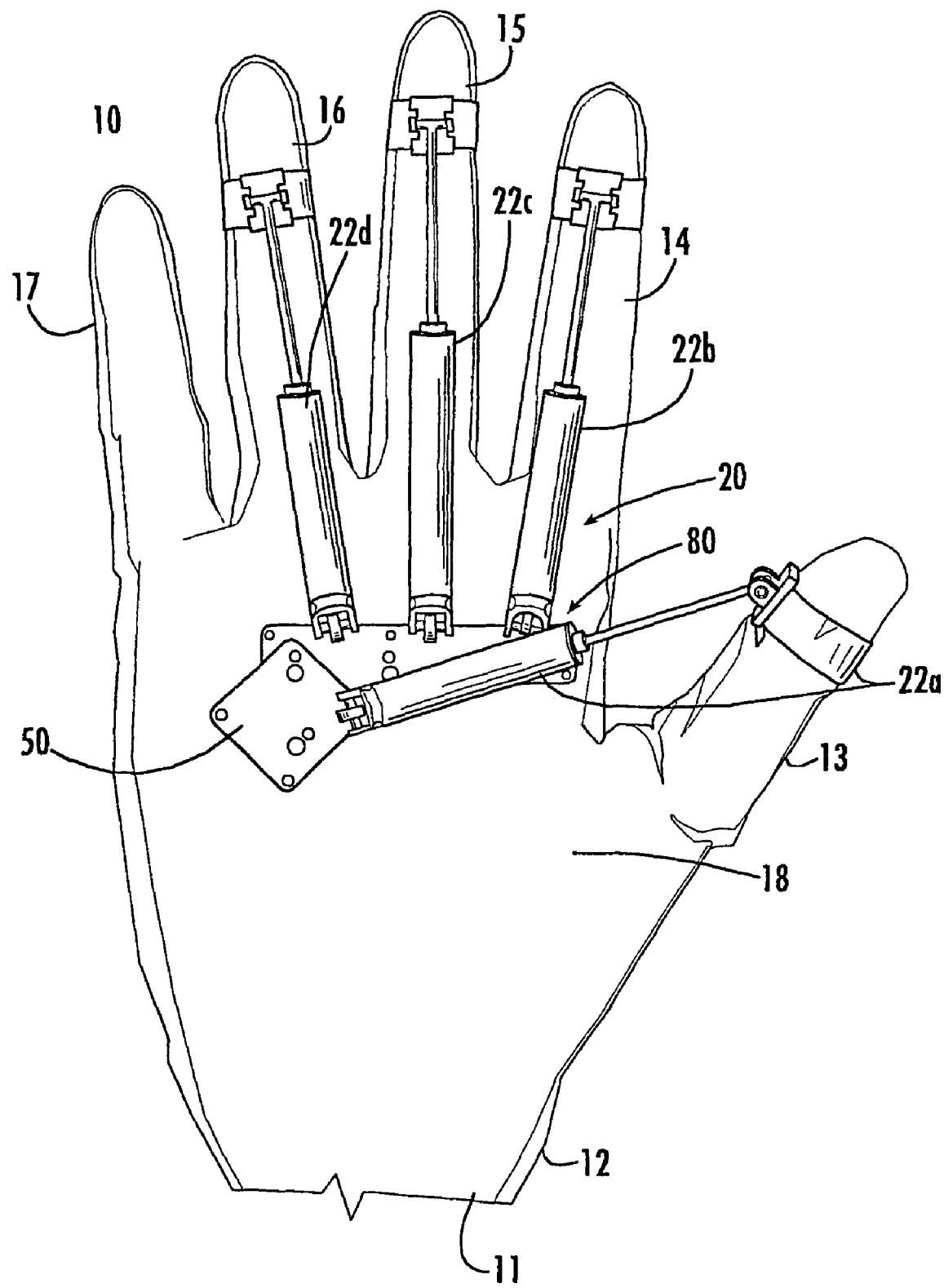
FIG. 1A is a front perspective view of a hand force feedback and sensing system in accordance with the teachings of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1A is a front perspective view of hand force feedback and sensing system 10 in accordance with the teachings of the present invention. System 10 includes actuator system 20 and sensing system 80 coupled by palm base 50 to glove 12. Hand 11 is received in glove 12. Hand 11 has thumb digit 13, index finger digit 14, middle finger digit 15, ring finger digit 16 and little finger digit 17 each connected to palm portion 18. Preferably, actuator system 20, sensing system 80 and palm base 50 are lightweight. For example, system 10 can weigh less than about 100 g.

Actuator system 20 comprises actuators 22a, 22b, 22c and 22d which respectfully provide force feedback against thumb digit 13, index finger digit 14, middle finger digit 15 and ring finger digit 16. Accordingly, actuator 22a–22d aid in opening or closing of digits 13–16. The force feedback is simulative of the real experience a user would have if directly manipulating a real object. It has been found that four actuators are sufficient to provide realistic response. It will be appreciated that actuator system 20 can be expanded to also include an actuator for providing force feedback against little finger digit 17. Glove 12, hand 11 and system 10 can have different sizes, i.e. "small", "medium" and "large".

Figure 1B:
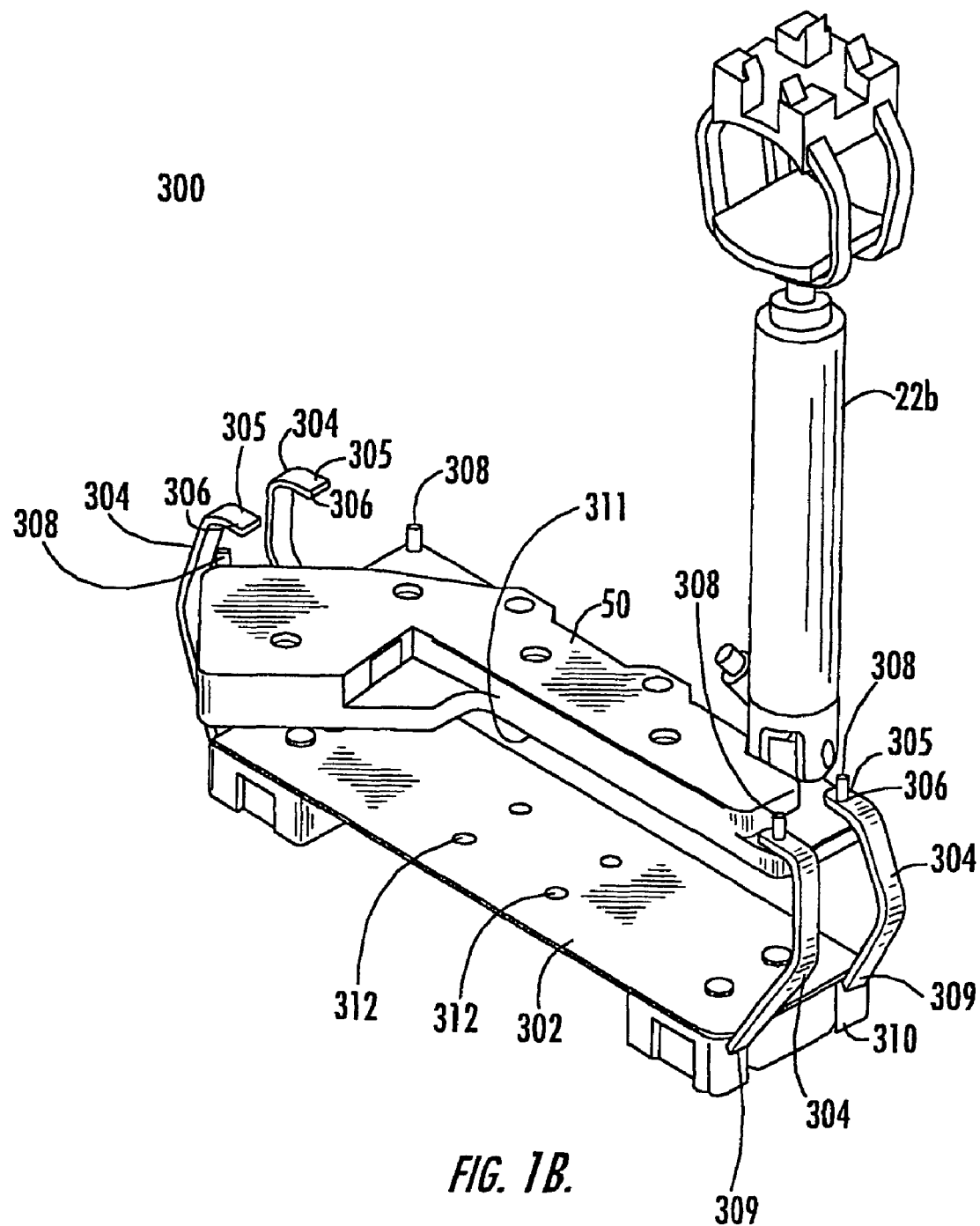
FIG. 1B is a perspective view of an embodiment of the system in which a hand mount attaches the palm base to the hand.
Figure 1C:
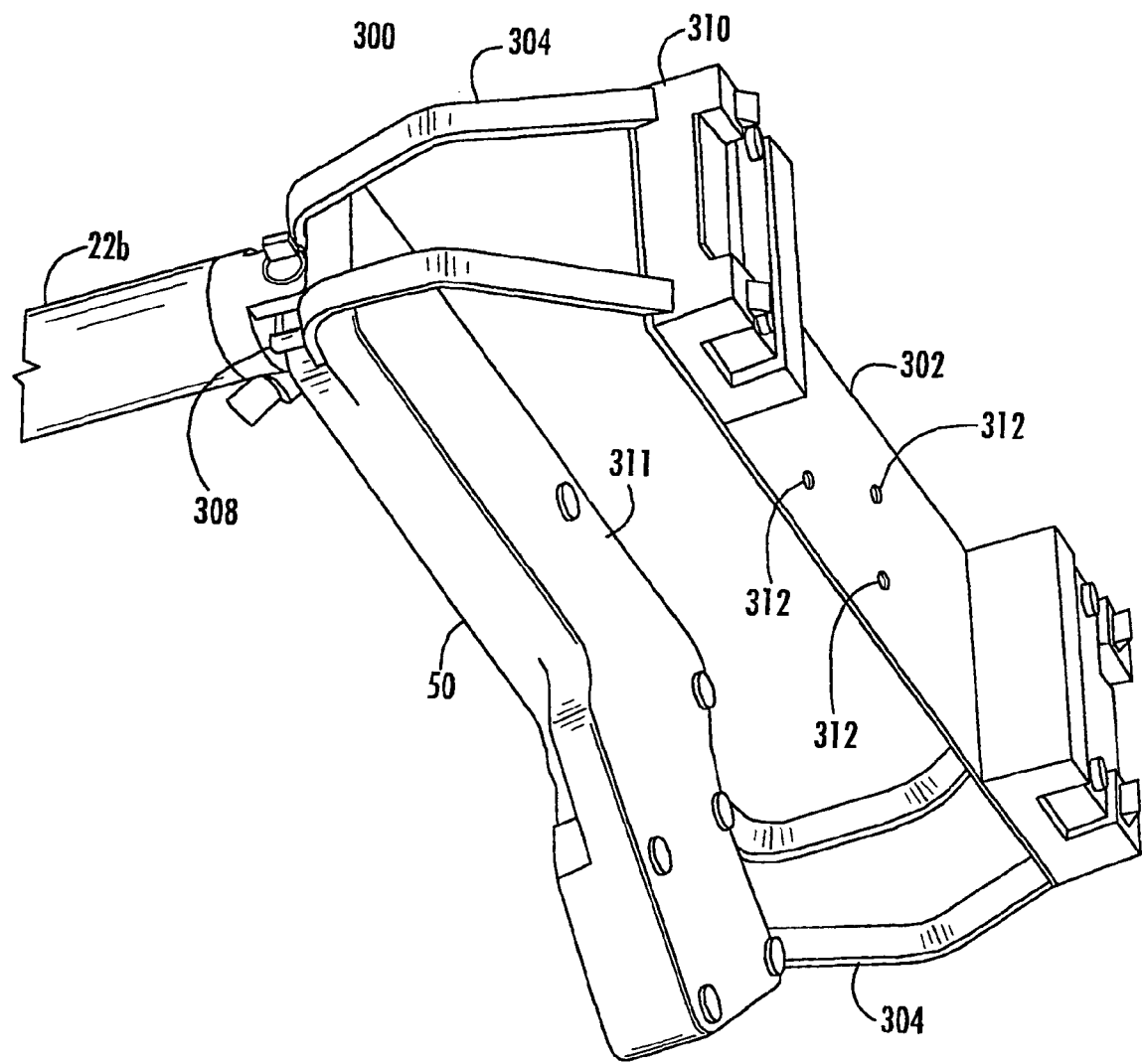
FIG. 1C is a perspective view of the hand mount from the bottom and side of FIG. 1B.
Figure 1D:
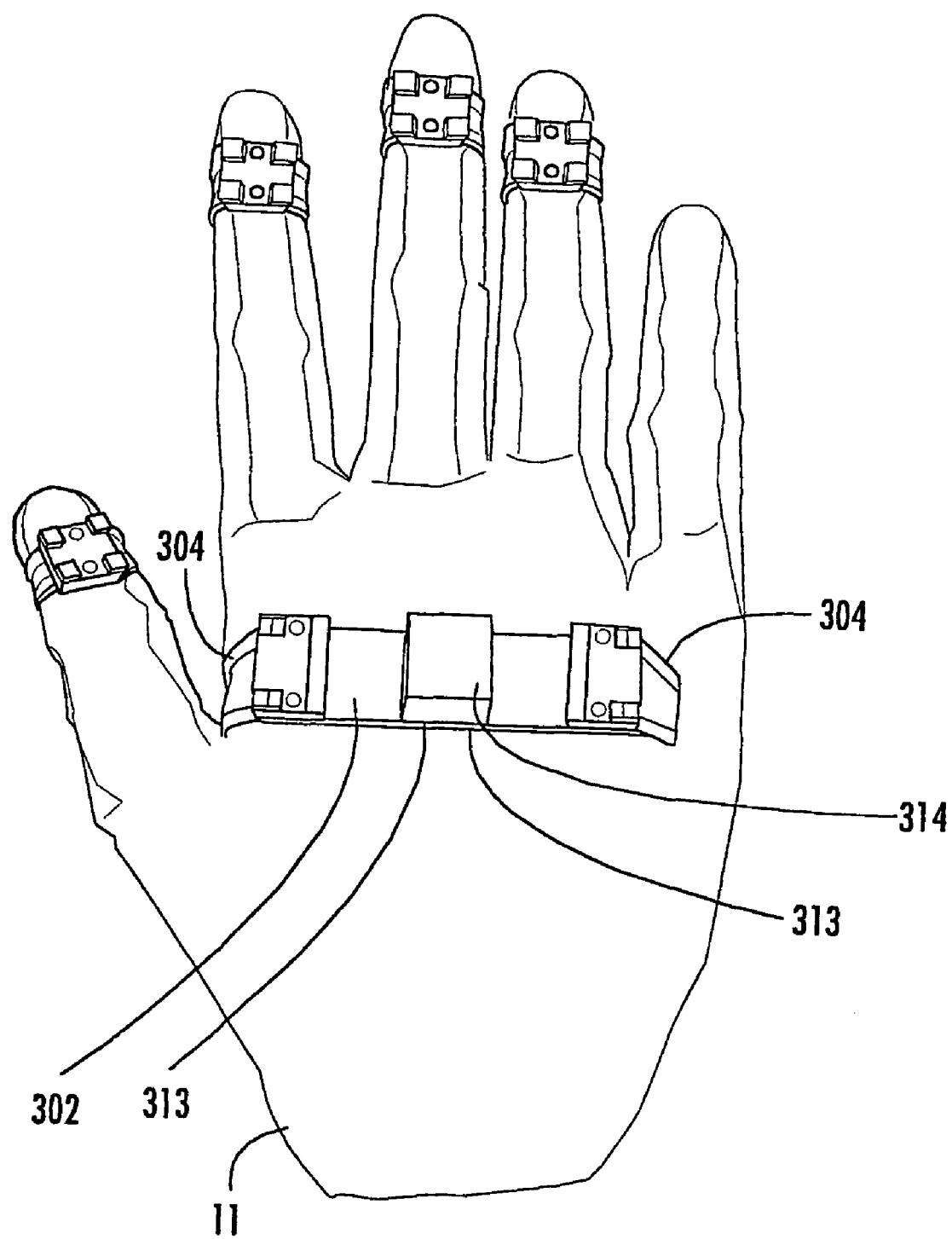
FIG. 1D is a perspective view of the rear of the hand including the attachment of the hand mount shown in FIG. 1B and FIG. 1C and attachment of a wrist position sensor to the hand mount.

In an alternate embodiment shown in FIGS. 1B–1D, palm base 50 is attached directly to hand 11 with hand mount 300. FIG. 1B illustrates actuator 22b attached to palm base 50. It will be appreciated that actuators 22a, 22c and 22d can be also attached to palm base 50. Hand mount base 302 is attached with a plurality of side mounts 304 to palm base 50. For example, side mounts 304 can be formed of flexible beams. End 305 of side mounts 304 include aperture 306. Aperture 306 is received over post 308 attached to palm base 50. End 309 of side mounts 304 is received in self-locking head 310. During use, hand 11 is received between bottom surface 311 of palm base 50 and top surface 312 of hand mount base 302 and hand 11 is coupled by side mounts 304 to palm base 50. Hand mount base 302 includes apertures 312 as shown in FIGS. 1B and 1C. Attachments 313 to wrist position sensor 314 is received in apertures 312. Wrist position sensor 314 can be a six degree of freedom position sensor, for example as manufactured by Polhemus Inc. as "Fast Track".

Figure 2A:
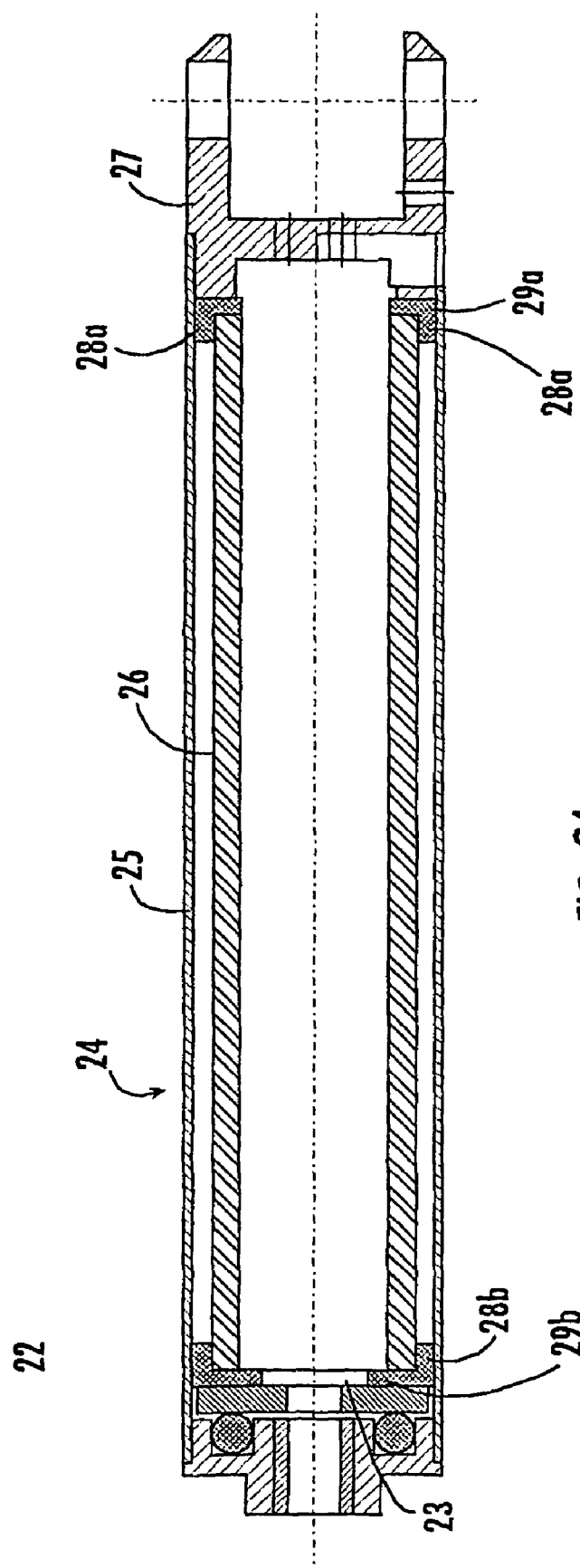
FIG. 2A is a cross sectional view of an actuator used in the system.

Each of actuators 22a–22d comprise moveable piston 23 which moves within cylinder body 24, as shown in FIG. 2A. In a preferred embodiment, cylinder body 24 is formed of outer cylinder 25 and inner cylinder 26 which are seated on bottom cylinder cap 27. Outer cylinder 25 is preferably formed of a metal, such as stainless steel, for supporting radial force or torques on cylinder body 24. Preferably, inner cylinder 26 is formed of resistive glass, such as Pyrex, for supporting air pressure.

Figure 2B:
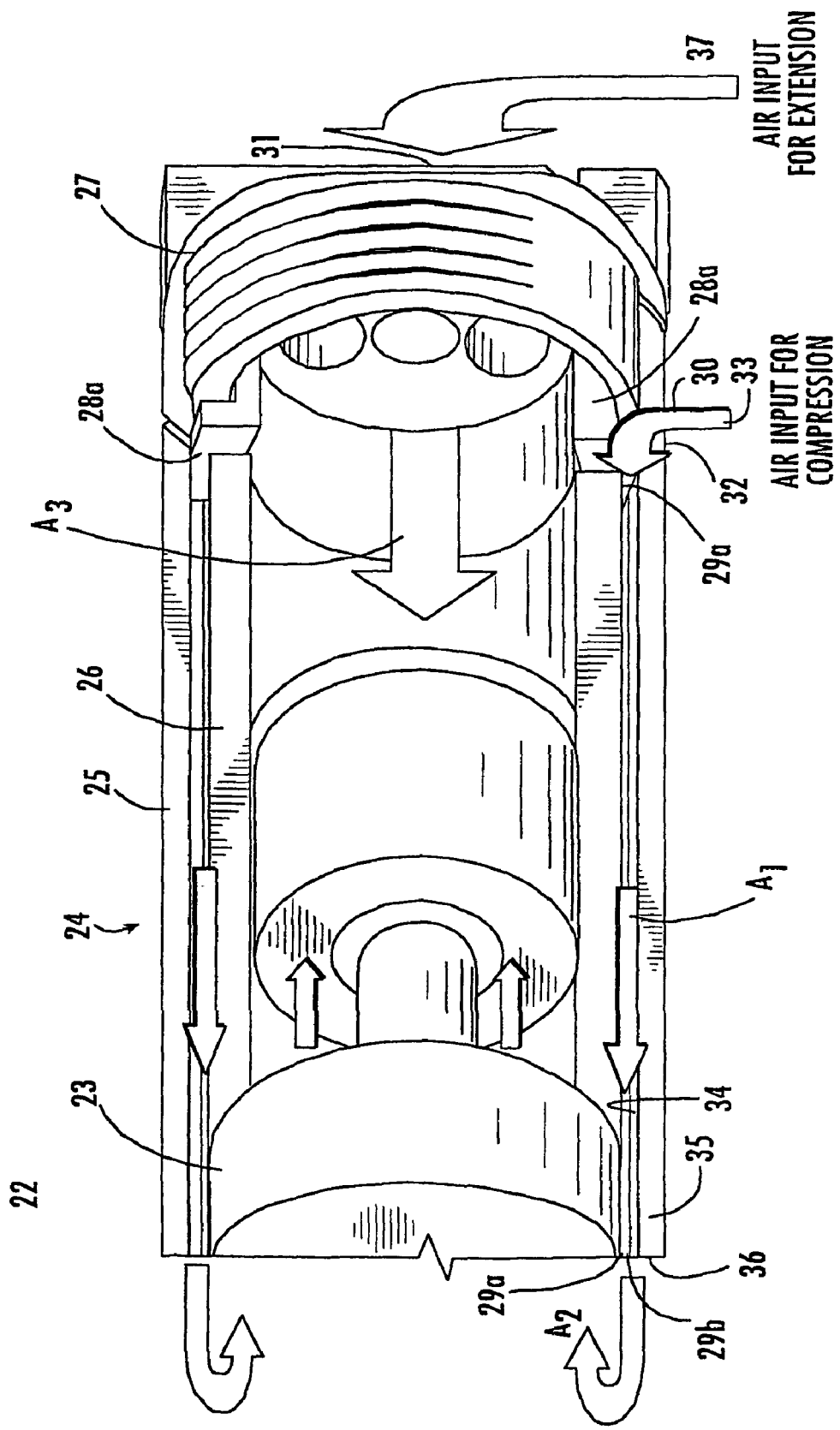
FIG. 2B is an interior view of the actuator showing air flow direction during compression and extension.

Gasket 28a seals inner cylinder 26 to outer cylinder 25 and bottom cylinder cap 27. Gasket 28b seals top portion 36 of inner cylinder 26 to outer cylinder 25. Aperture 29a is formed through gasket 28a and aperture 29b is formed in gasket 28b. Air inlet 30 is positioned through bottom portion 32 of outer cylinder 25, as shown in FIG. 2B. Air inlet 31 is positioned through bottom cylinder cap 27. Air 33 from air inlet 30 received through aperture 29a in gasket 28a circulates upwardly in the direction of arrow $A_1$, between outside 34 of inner cylinder 26 and inside 35 of outer cylinder 25 through aperture 29b in gasket 28b to top portion 36 of inner cylinder 26. Air 33 enters from top portion 36 of inner cylinder 26 and pushes downwardly in the direction of arrow $A_2$ thereby compressing piston 23 within inner cylinder 26. Air 37 from air inlet 31 circulates upwardly in the direction of arrow $A_3$ thereby extending piston 23 within inner cylinder 26. Accordingly, cylinder body 24 is a double acting cylinder providing both compression and extension of piston 23. Air 33 and air 37 are pressurized, for example air 33 and air 37 can be pressurized up to about 100 psi, and air 33 and 37 is clear of oil and water.

Figure 3A:
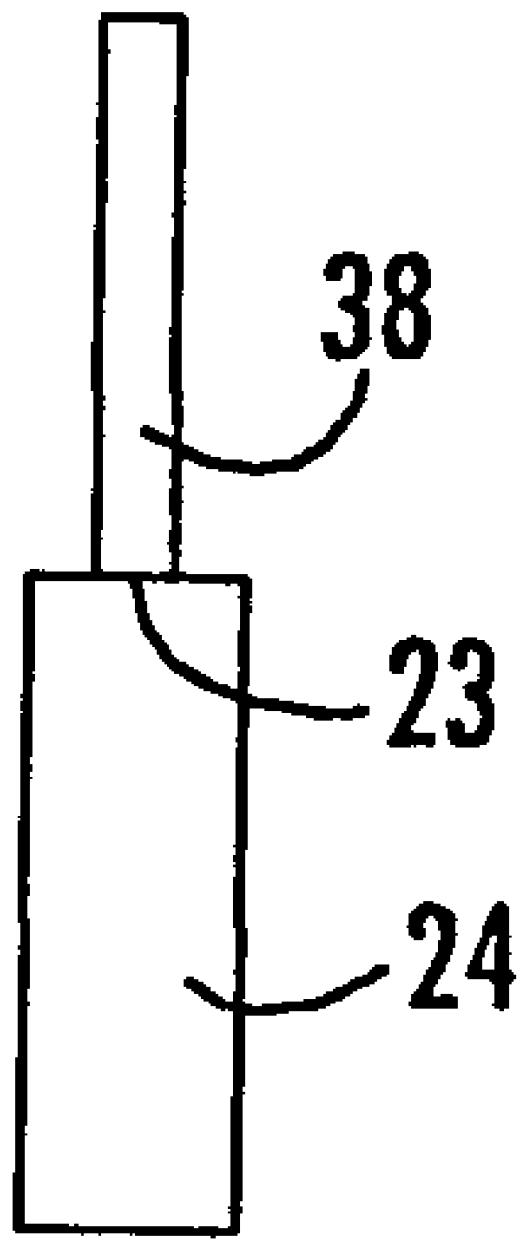
FIG. 3A is a schematic diagram of a piston rod of the actuator in an extended position.

Piston rod 38 extends from piston 23 of cylinder body 24 as shown in FIG. 3A. The size of actuator 22a–22d in the extended position of piston rod 38 is inversely proportional to the minimum size of a virtual object that can be grasped by a user of system 10. The size of actuator 22a–22d can be defined by the compression rate which corresponds to the rate of closing of a respective digit 13–16.

Preferably, for the "large" size, cylinder body 24a has a length of about 1.65 inches in compressed position and a length of about 3.0 inches in the extended position, cylinder body 24b has a length of about 1.75 inches in compressed position and a length of about 3.25 inches in the extended position, cylinder body 24c has a length of about 2.0 inches in compressed position and a length of about 3.75 inches in the extended position, cylinder body 24d has a length of about 1.90 inches in compressed position and a length of about 3.50 inches in the extended position. The size of actuator 22a–22d for "medium" size and "small" size are respectively 10% and 20% less than the size for the "large" size. Accordingly, cylinder body 24 has a compression rate of 54%, 58% and 62% for the "large", "medium" and "small" sizes respectively.

Figure 3B:
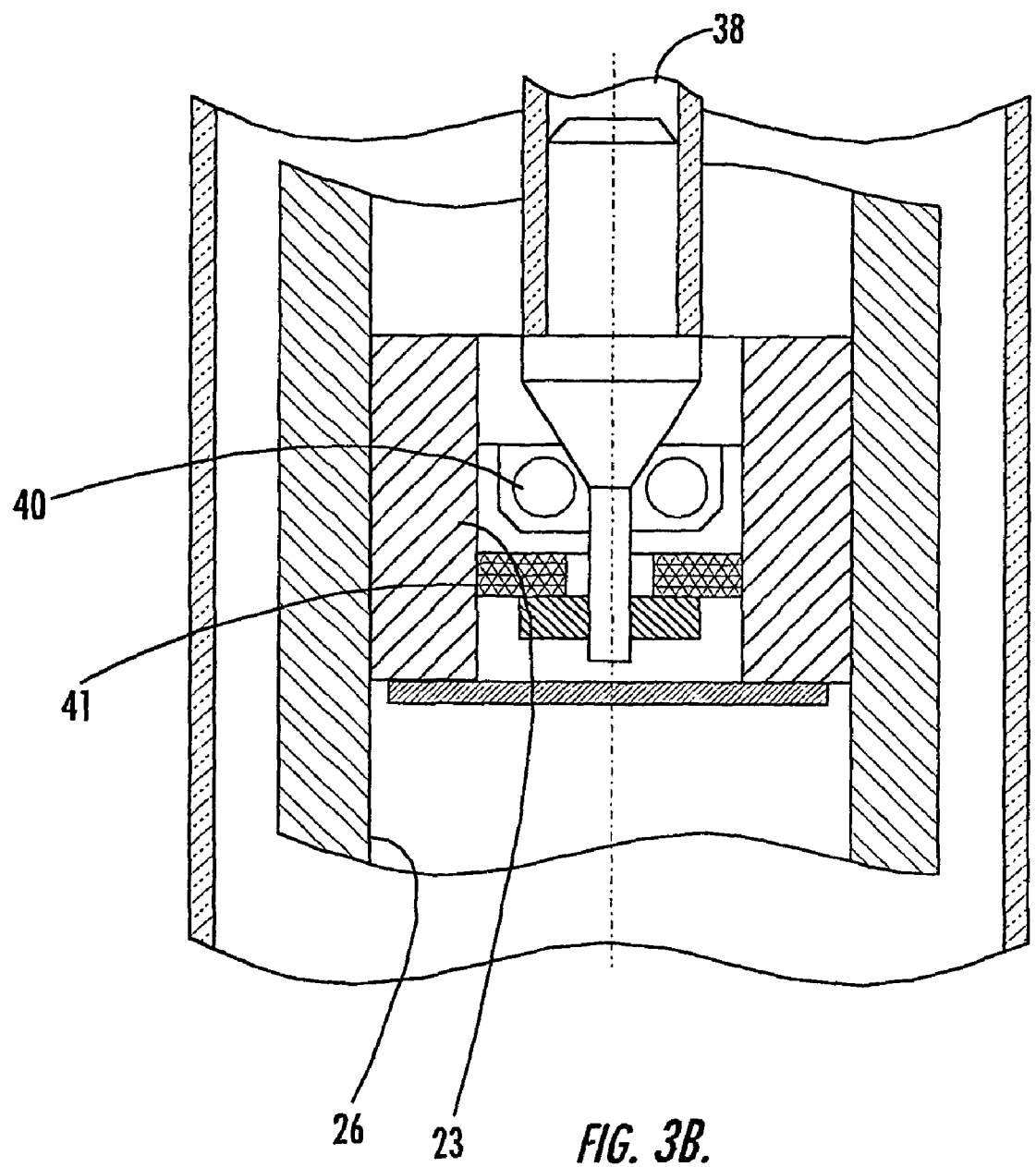
FIG. 3B is a sectional view of a piston of the actuator connected to the piston rod within an inner cylinder of the actuator.

Piston rod 38 is fixed within piston 23, as shown in FIG. 3B. Piston 23 is received within inner cylinder 26. Preferably, piston 23 is formed of material having a low coefficient of friction. For example, piston 23 can be formed of a carbon and graphite material. Preferably, piston rod 38 is coupled to piston 23 with spherical joint 40 and silicon joint 41, for reducing the constraint caused by any error of alignment between piston rod 38 and inner cylinder 26, thereby reducing air leaks between piston 23 and inner cylinder 26.

Figure 4A:
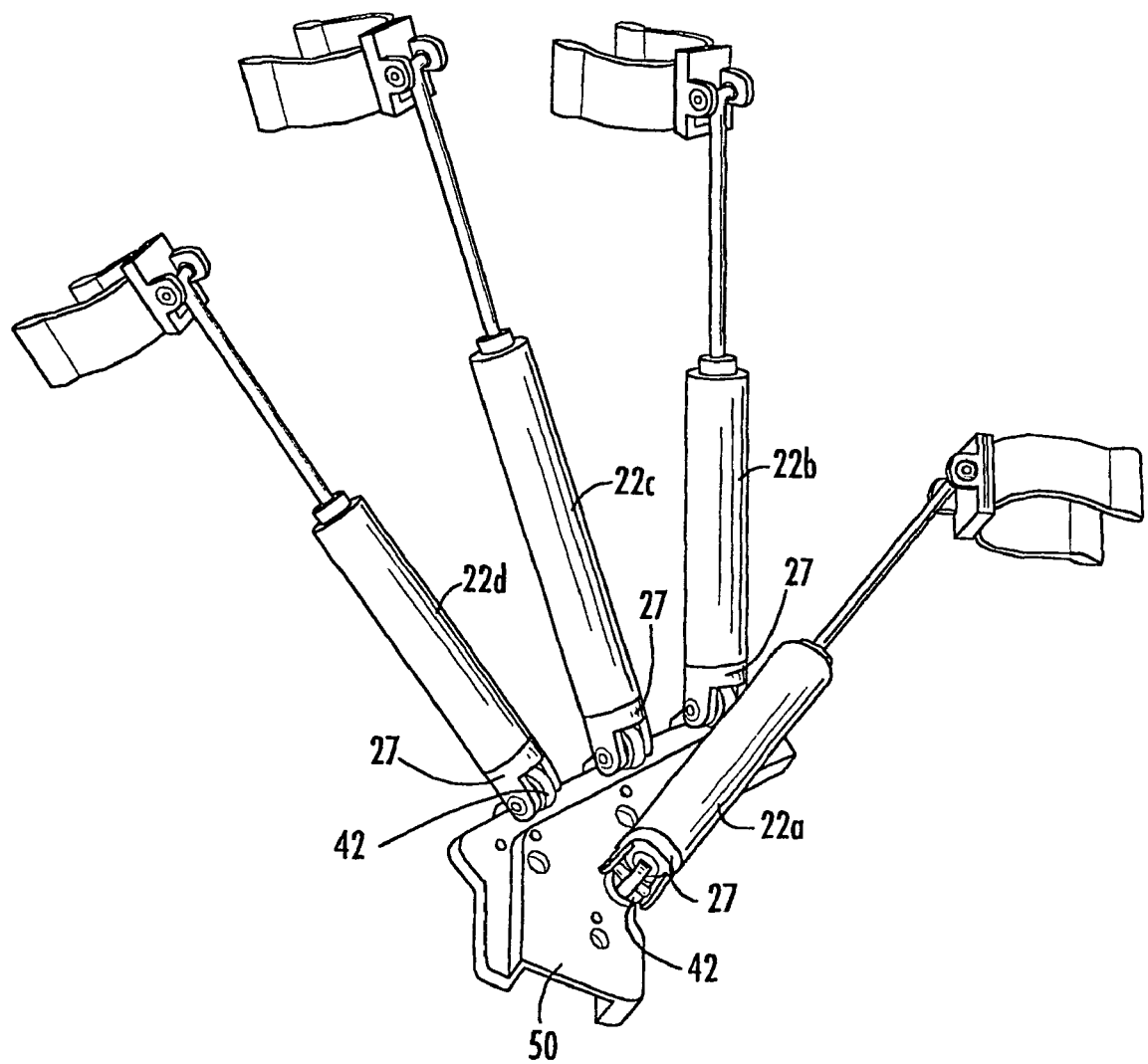
FIG. 4A is a perspective view of attachment of cylinders of the actuator to a palm base.
Figure 4B:
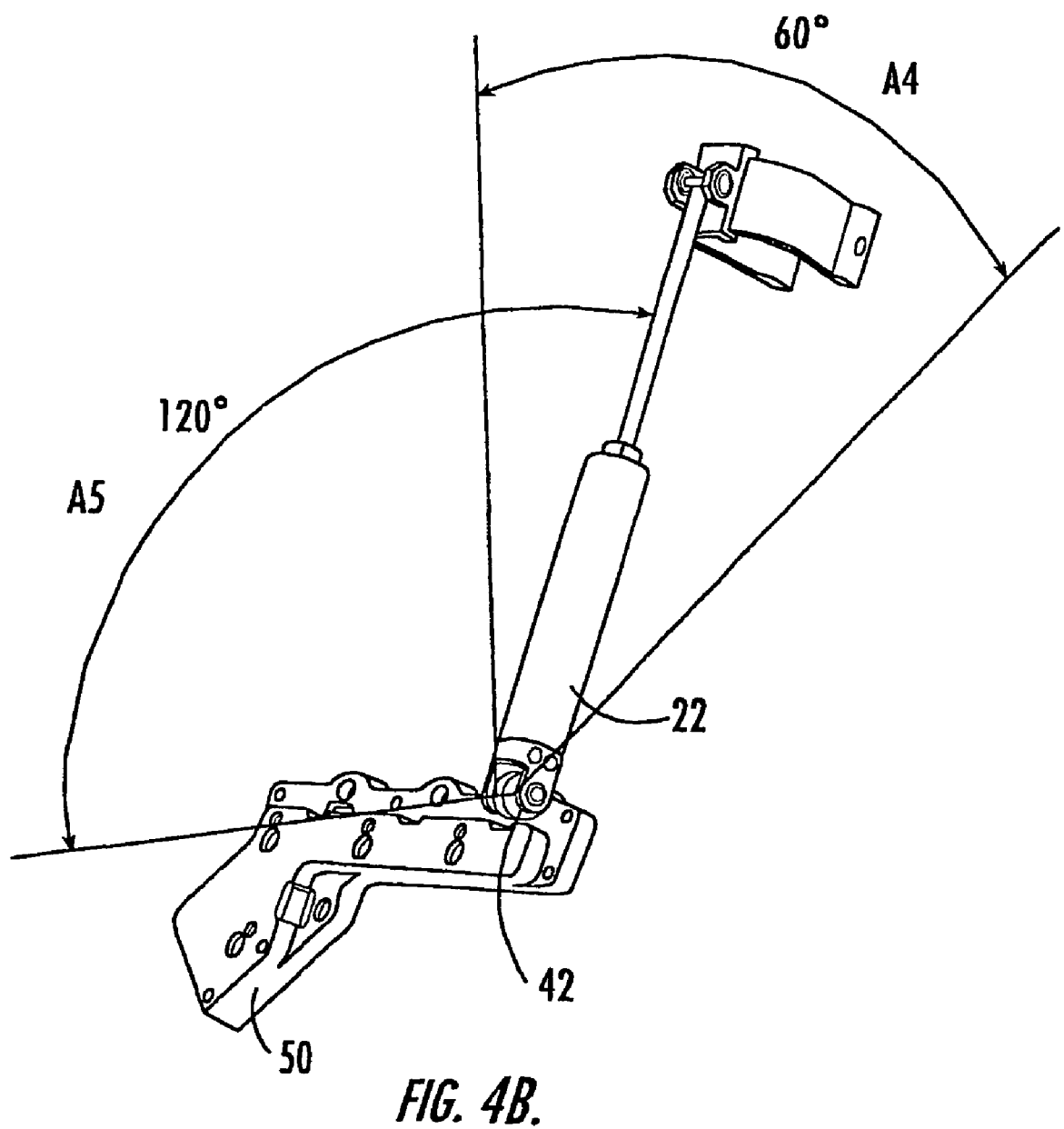
FIG. 4B is a schematic diagram of rotation of one of the cylinders on a flexion axis and an abduction axis.
Figure 4D:
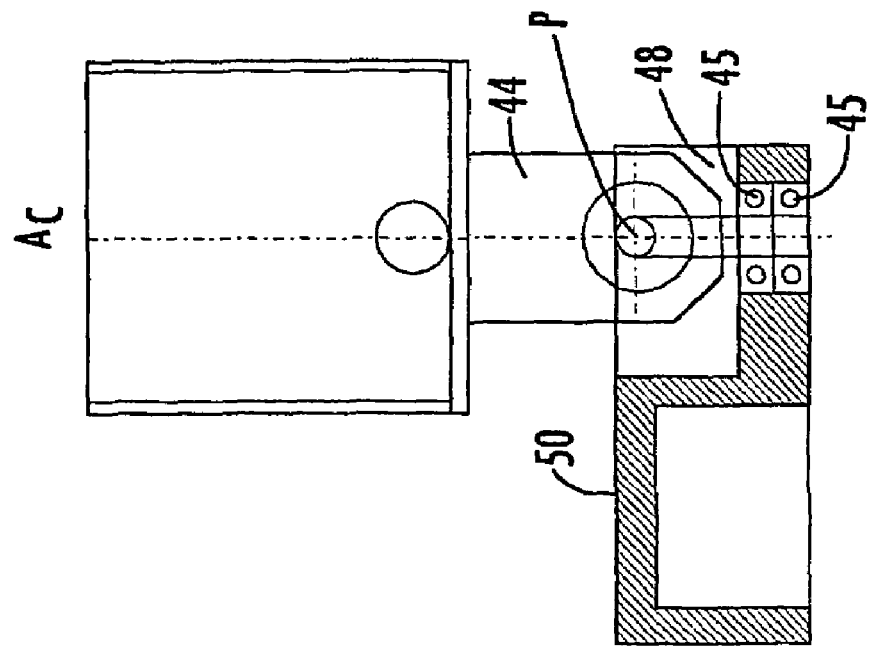
FIG. 4D is a sectional diagram of a joint for mounting the actuator for providing rotation on an abduction axis.
Figure 4C:
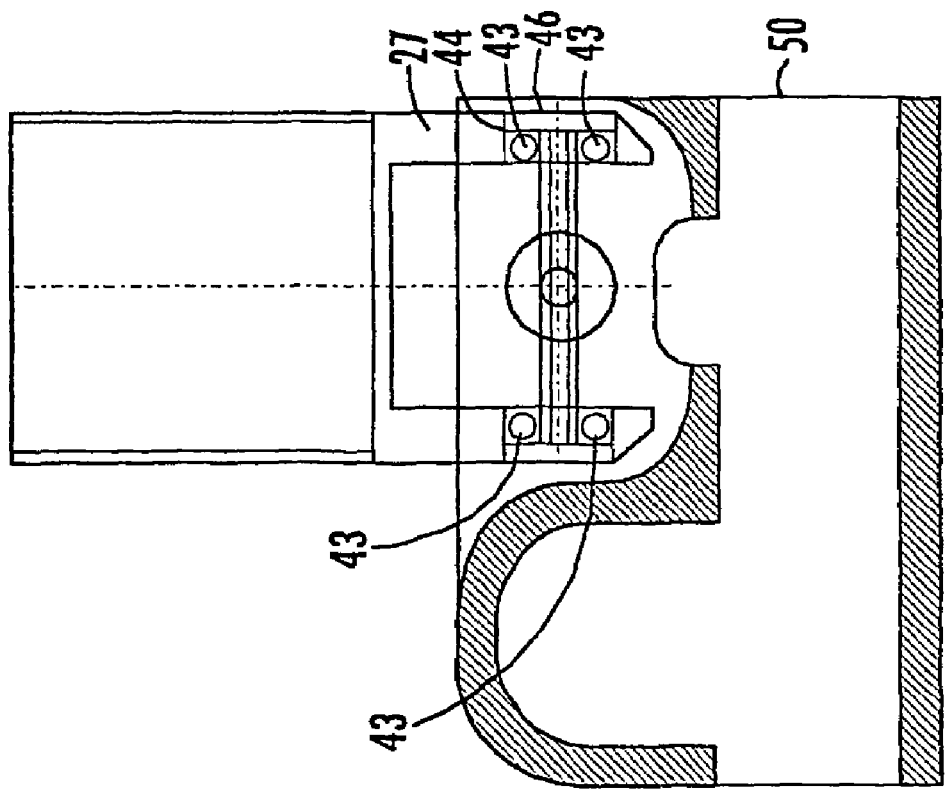
FIG. 4C is a sectional diagram of a joint for mounting the actuator for providing rotation on a flexion axis.

FIGS. 4A and 4D illustrate attachment of actuator 22a–22d to palm base 50. Joint 42 rotatably attaches bottom cylinder cap 27 to palm base 50 for allowing two degrees of freedom rotation. Joint 42 provides rotation on a flexion axis, axis $A_F$, thereby providing front to back rotation of respective digits 13–17 in the direction of arrow $A_5$ in about a 120° angular range, as shown in FIG. 4B. Joint 42 provides rotation on an abduction/adduction axis, axis $A_4$, thereby providing side to side rotation of respective digits 13–17 in the direction of arrow $A_4$ in about a 60° angular range.

Bearings 43 rotatably mount side surface 46 of leg 44 of bottom cylinder cap 27 to palm base 50 for providing rotation on flexion axis $A_F$. Bearings 45 rotatably mount bottom surface 48 of leg 44 of bottom cylinder cap 27 to palm base 50 for providing rotation on abduction/adduction axis, $A_4$. Preferably bearings 43 and 45 are miniature, for example, bearings 43 and 45 can have an inner diameter of about 0.04 inches and an outer diameter of about 0.125 inches for reducing friction. Flexion axis, $A_F$, abduction axis, $A_4$, and cylinder axis, $A_C$, intersect at a single point, P, for providing improved error during computation of a kinematics model of each finger for a sensor located at point P, as described below.

Figure 5A:
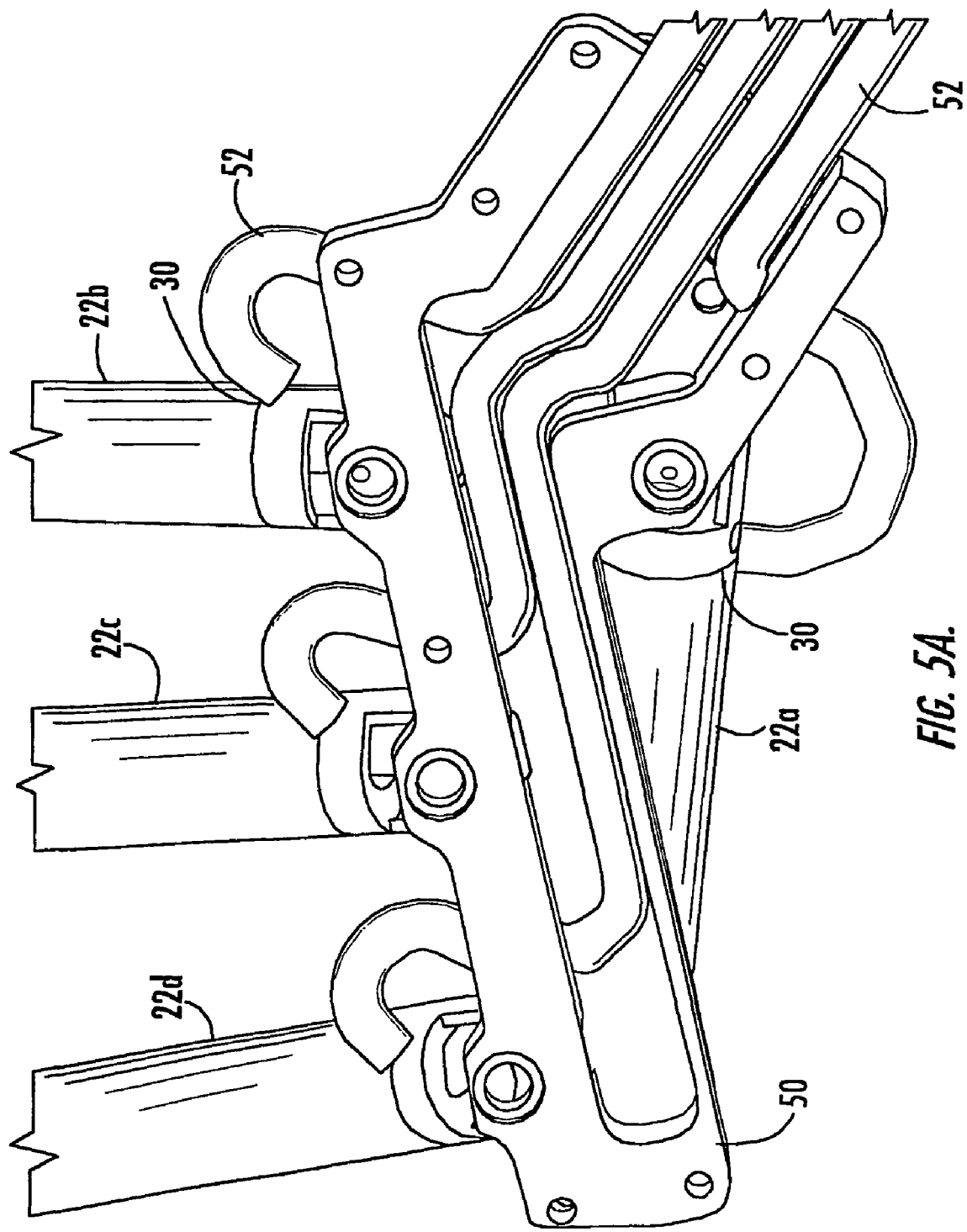
FIG. 5A is a perspective view of a palm base including integrated air tubing connected to the cylinder of the actuator.
Figure 5B:
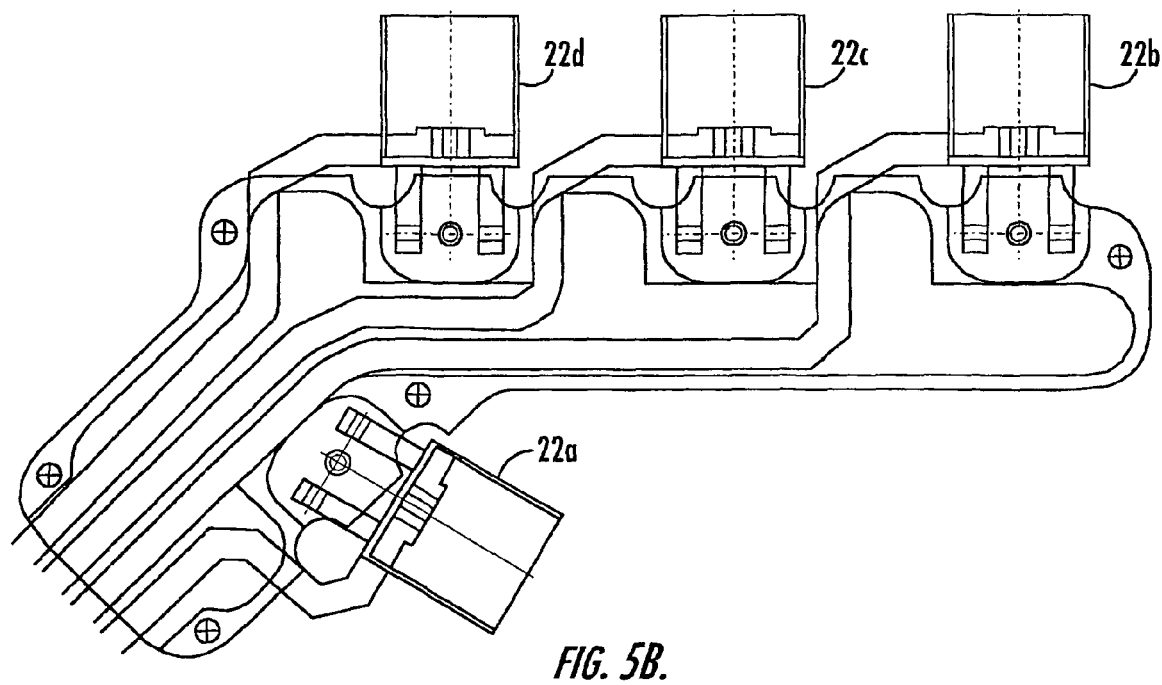
FIG. 5B is a top elevational view of the palm base.
Figure 5C:
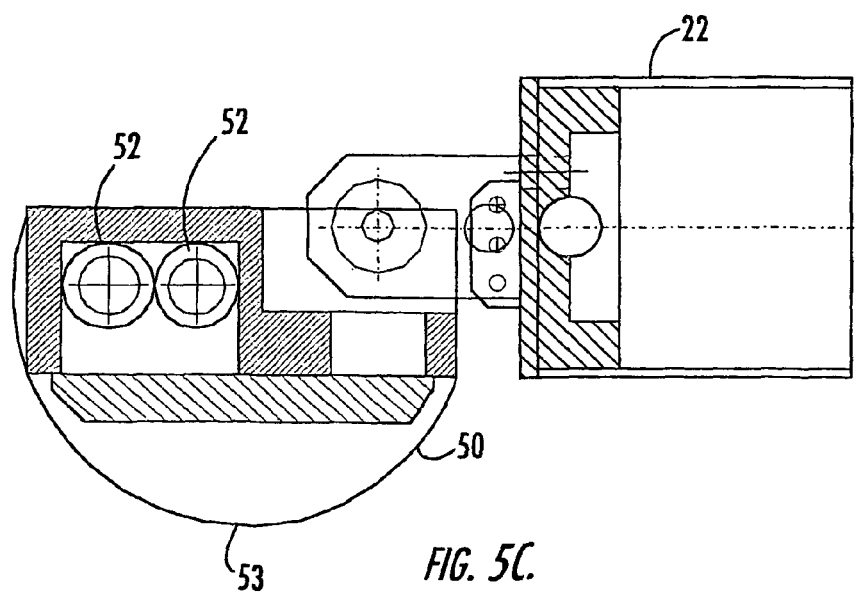
FIG. 5C is an end view of the palm base taken from the right of FIG. 5B.

FIGS. 5A–5C illustrate palm base 50. Tubing 52 connects to air inlet 30 of each of actuators 22a–22d. Preferably, tubing 52 is mounted or integrally connected to palm base 50 for allowing full range of motion of actuator 22a–22d. Tubing 52 is preferably formed of a flexible material. A suitable material for tubing 52 is silicon, rubber or polyvinylchloride (PVC). A fabric material can be used to surround tubing 52. Bottom surface 53 of palm base 50 has a rounded shape as shown in FIG. 5C. Preferably, the outer diameter of bottom surface 53 is in the range of about 10 mm to about 20 mm and most preferably is about 13 mm. It will be appreciated that additional tubing not shown can be connected to air inlet 31 and integrated inside palm base 50.

Figures 6A, 6B:
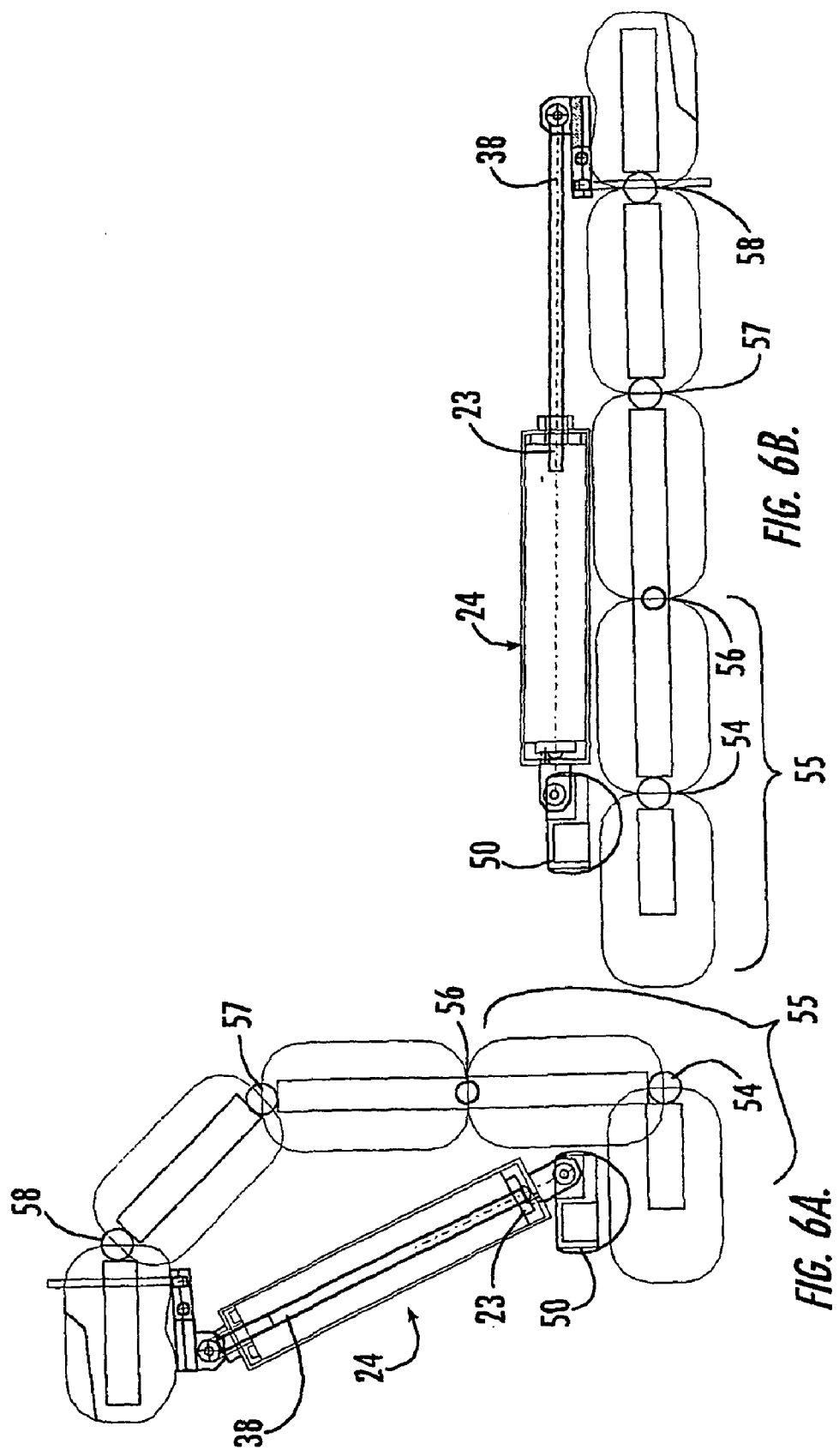
FIG. 6A is a schematic diagram of the actuator in a compressed position of a digit of the hand.
FIG. 6B is a schematic diagram of the actuator in an extended position of a digit of the hand.

Palm base 50 is attached approximately at middle portion 54 of palm 55 adjacent the metacarpal phalanx crease line, as shown in FIGS. 6A–6B. The shape and size of bottom surface 53 of palm base 50 provides complete flexion of the metacarpal phalanx and is more comfortable in a user's hand than a flat shape. Digit 13 includes bottom joint 56 and fingertip joint 58. Digits 14–17 each include bottom joint 56, middle joint 57 and fingertip joint 58. In the compressed position shown in FIG. 6A, piston rod 38 is compressed within cylinder body 24 for closing bottom joint 56, middle 57 and fingertip joint 58, thereby providing force feedback for simulating grasping of an object. In the extended position shown in FIG. 6B, piston rod 38 is extended from cylinder body 24 for extending bottom joint 56, middle 57 and fingertip joint 58.

Figure 7A:
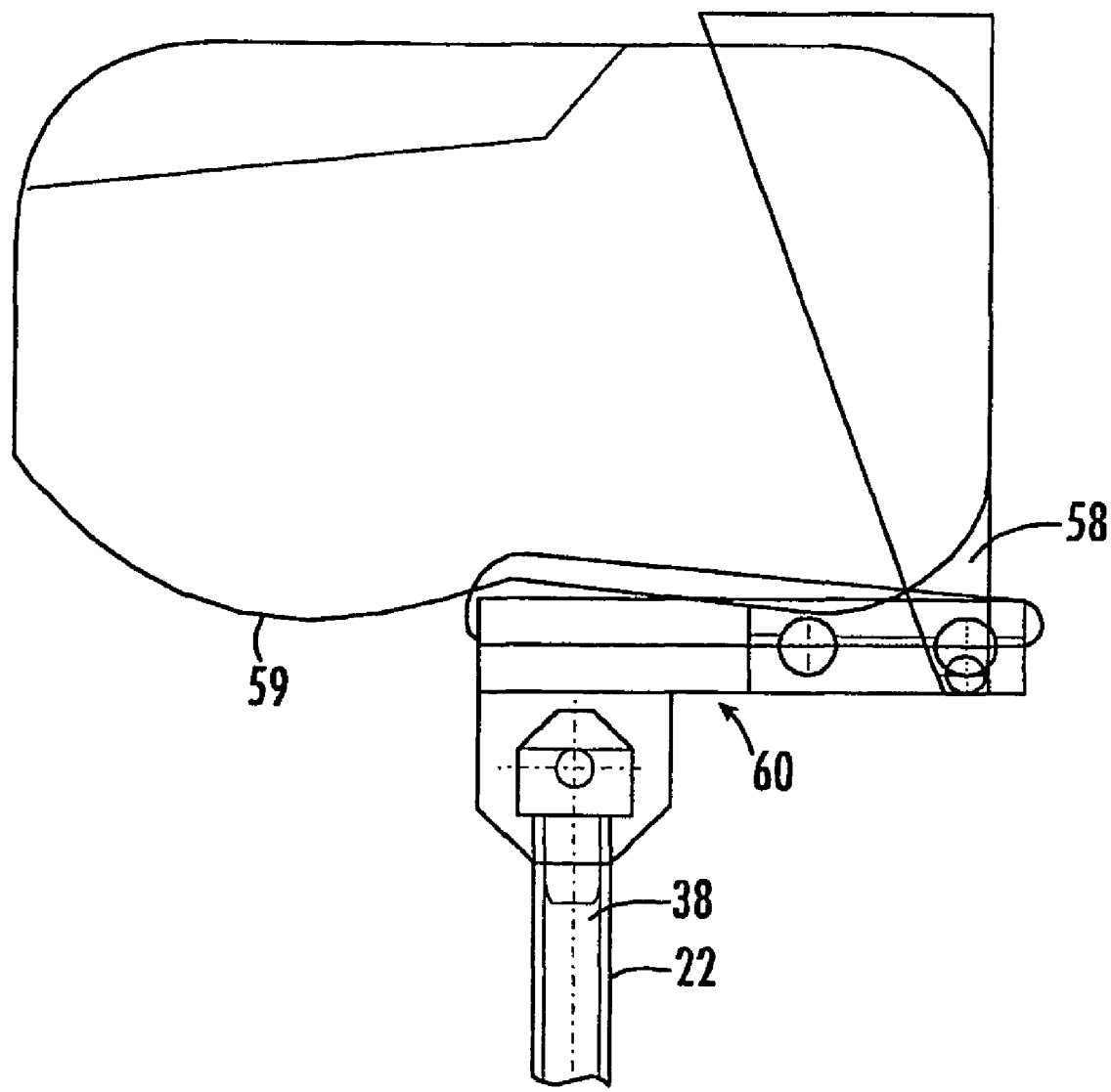
FIG. 7A is a side elevational view of a fingertip mount connected to a fingertip.
Figure 7B:
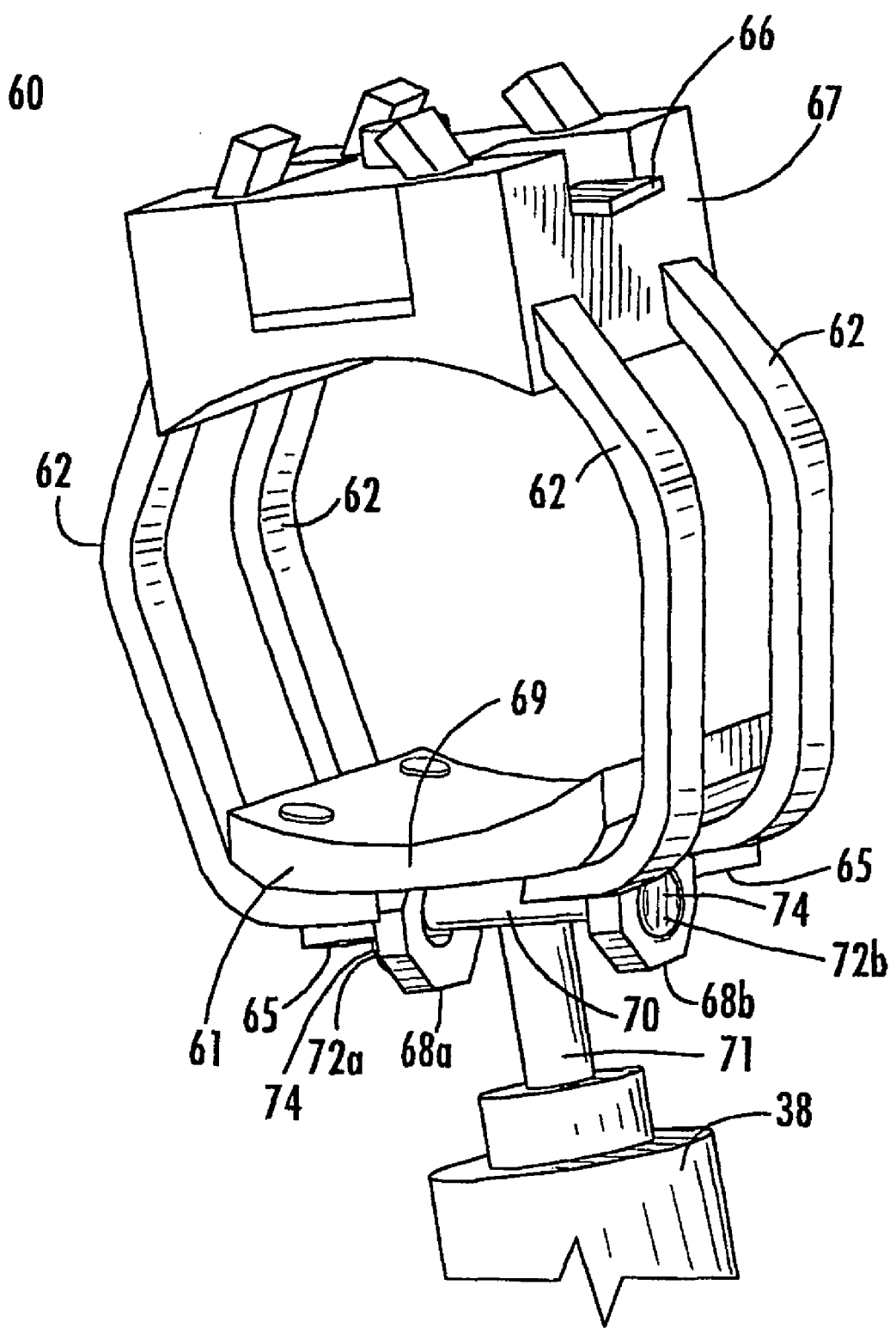
FIG. 7B is a perspective view of the fingertip mount.

Fingertip joint 58 of each of digits 13–17 is attached to a piston rod 38 of a respective actuator 22a–d with fingertip mount 60, as shown in FIGS. 7A and 7B. Fingertip mount base 61 of fingertip mount 60 is attached adjacent to bottom surface 59 of fingertip joint 58. A plurality of side mounts 62 are attached to fingertip mount base 61. Side mounts 62 have a rounded shape for sliding over fingertip joint 58. For example, side mounts 62 can be formed of flexible beams. A suitable material for side mounts 62 is stainless steel covered with silicon rubber. Screws 65 mount side mounts 62 to fingertip mount base 61. Side mounts 62 are received in self-locking head 66 for coupling fingertip mount 60 to fingertip joint 58. Release latch 67 releases side mounts 62 from self-locking head 66 for removal of fingertip mount 60 from fingertip joint 58.

Legs 68a and 68b extend from bottom surface 69 of fingertip mount base 61. Axle 70 connects upper portion 71 of piston rod 38 to legs 68a and 68b. Ends 72a and 72b of axle 70 are rotatably mounted to respective legs 68a and 68b with bearings 74 for providing one degree of freedom rotation. Bearings 74 can be similar to bearings 43 and 45 described above.

FIGS. 8–11 illustrate sensing system 80. Sensing system 80 comprises linear sensor 81, abduction angular sensor 100, flexion angular sensor 102 and force sensor 110 which are each coupled to palm base 50 for example with a PCB sensor board. Linear sensor 81 includes reflective infrared sensors 82a, 82b and 82c which are mounted to palm base 50 and coupled to a respective actuator 22a–22d, as shown in FIG. 8A. Reflective infrared sensor 82a, 82b and 82c measure the linear position of digits 13–17.

Fiber optic cables 83a, 83b and 83c connect respective reflective infrared sensors 82a, 82b and 82c to bottom cylinder cap 27. Fiber optic cables 83a, 83b and 83c extend through respective apertures 84a, 84b and 84c in bottom cylinder cap 27. Infrared waves 85 generated from reflective infrared sensor 82a travel through fiber optic cable 83a and are emitted by infrared emitter 86 coupled to fiber optic cable 83a. Infrared waves 85 are reflected by mirror 87 as reflected infrared waves 88. Mirror 87 is attached to bottom surface 99 of piston 23. Mirror 87 is thin, preferably having a thickness of about 0.02 inches to about 0.04 inches. Infrared waves 85 can also be reflected off mirror 27 towards inner cylinder 26 and reflected off inner cylinder 26. Reflected infrared waves 88 are received at infrared receptors 89a, 89b coupled to fiber optic cables 83b, 83c. Reflected infrared waves 88 travel through fiber optic cables 83b and 83c to reflective infrared sensors 82b, 82c. Reflective infrared sensors 82b, 82c use the values of reflected infrared waves 88 to determine the position of piston 23. It will be appreciated that additional infrared emitters and infrared receptors can be used in accordance with the teachings of the present invention to increase accuracy of the linear position measurement.

Preferably, reflective material 90 combined with absorbing material 91 form cover 95 of outside portion 34 of inner cylinder 26 to allow inner cylinder 26 to reflect infrared waves. Surface 92 of reflective material 90 increases progressively from bottom portion 32 to top portion 36 of inner cylinder 26. Surface 93 of absorbing material 91 decreases from bottom portion 32 to top portion 36 of inner cylinder 26. The combination of progressively increasing absorptive material and progressively decreasing absorptive material reduces sudden intensity variations between extreme positions at bottom portion 32 and top portion 36 of inner cylinder 26 for allowing accurate calibration of reflective infrared sensors 82a, 82b and 82c.

Figure 9B:
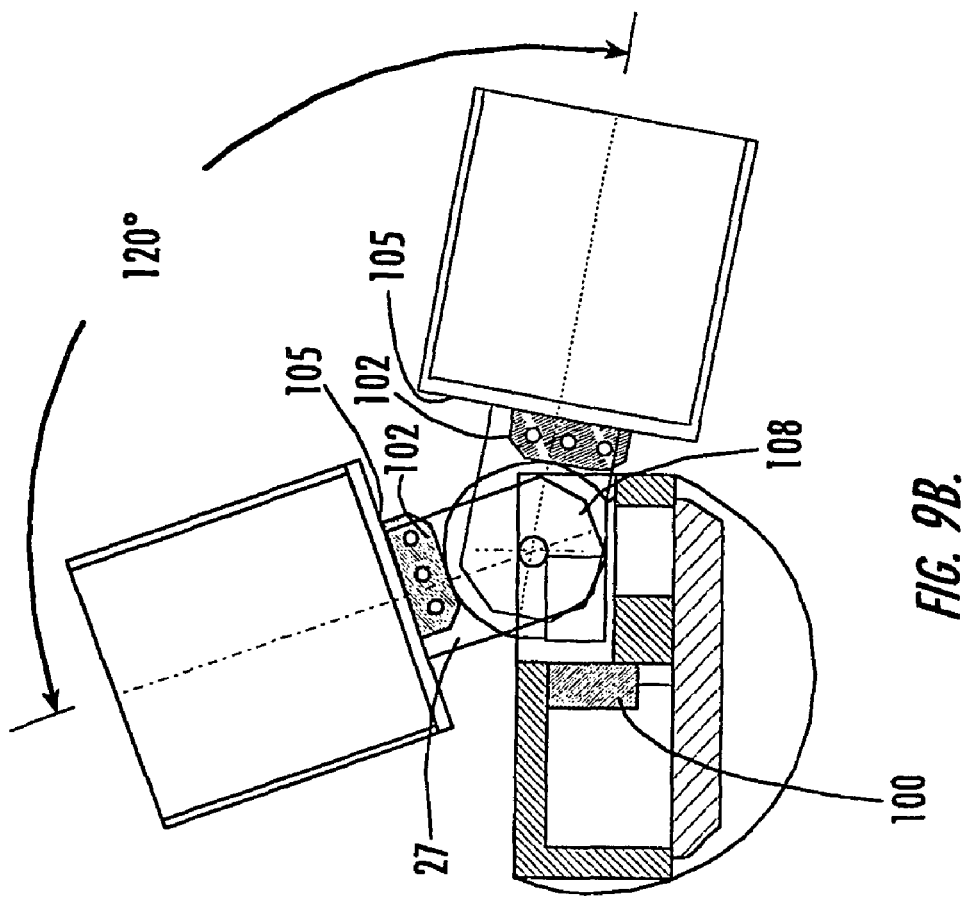
FIG. 9B is a sectional view of an angular sensor used in the system for measuring a flexion angle of rotation.
Figure 9A:
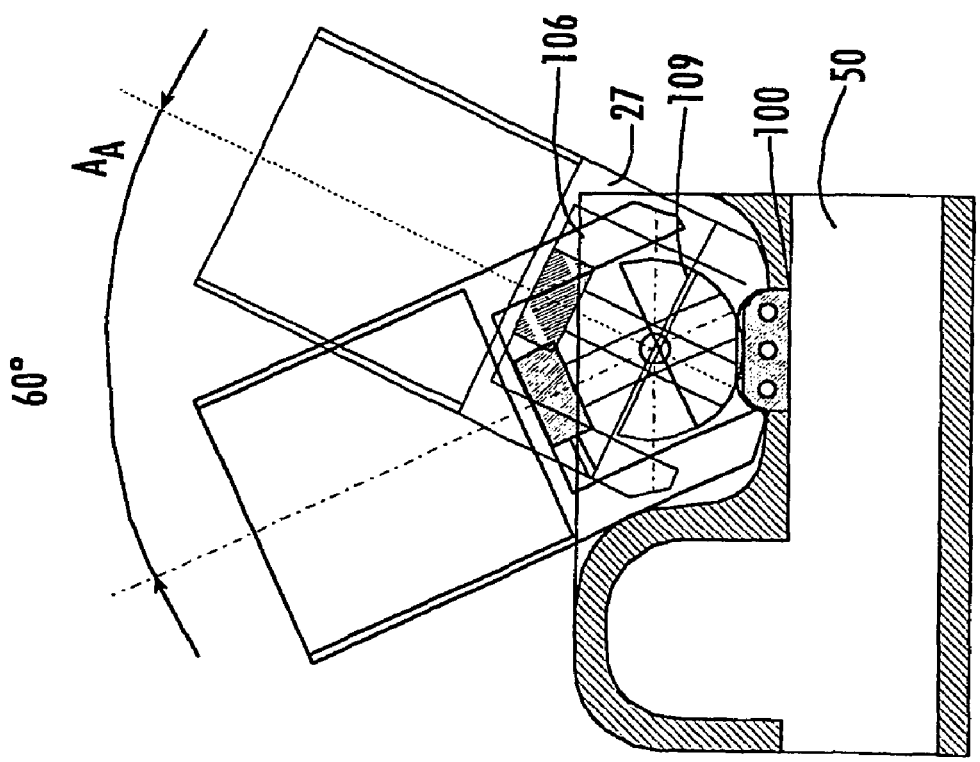
FIG. 9A is a sectional view of an angular sensor used in the system for measuring an abduction angle of rotation.
Figure 9C:
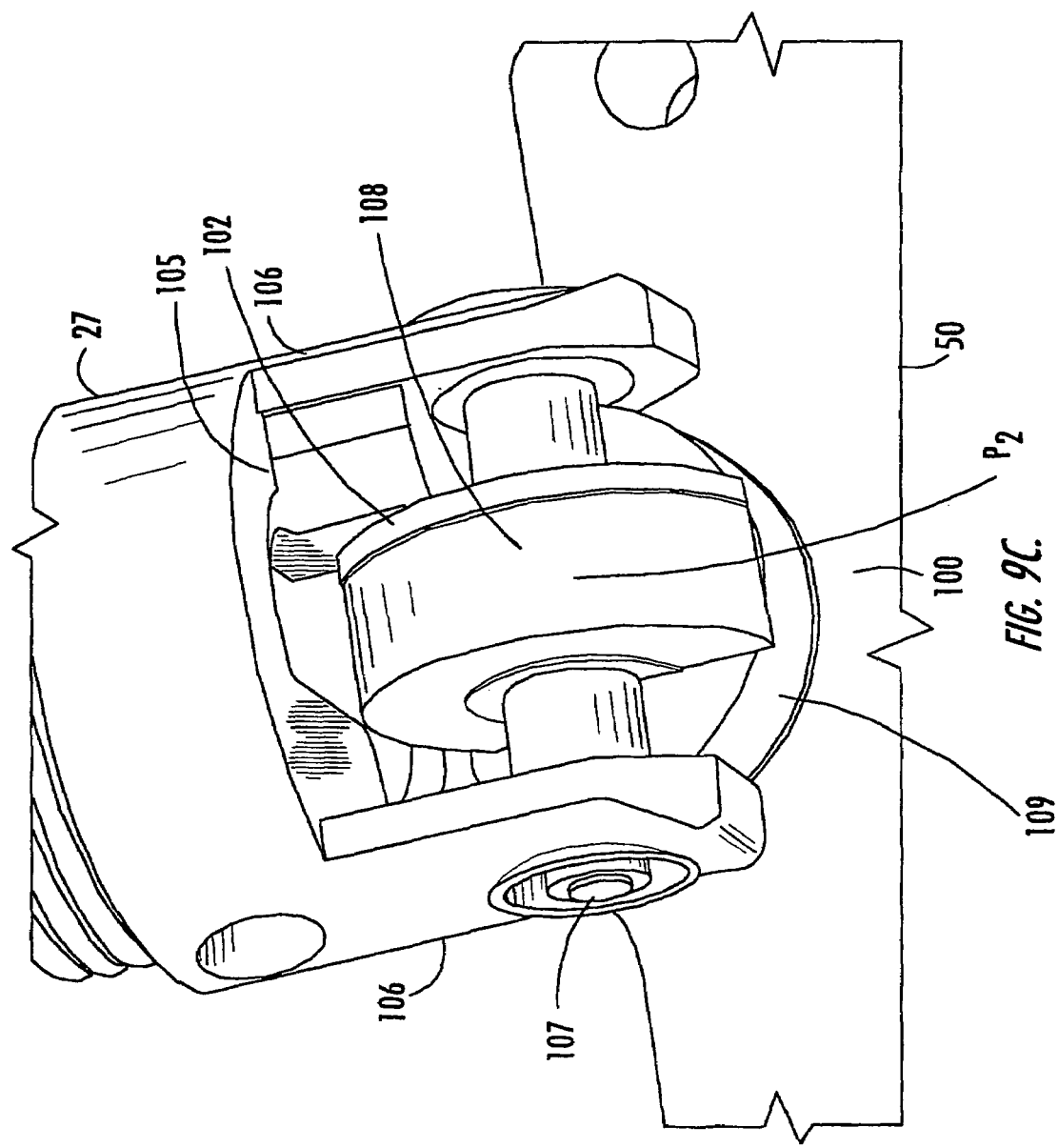
FIG. 9C is a perspective view of the angular sensors shown in FIGS. 9A and 9B.

Abduction angular sensor 100 measures the abduction angle, angle $A_A$ for measuring abduction motion, as shown in FIG. 9A. Abduction angle sensor 100 is mounted to palm base 50. Flexion angle sensor 102 measures angle flexion, angle $A_F$, for measuring flexion motion, as shown in FIG. 9B. Flexion angle sensor 102 is mounted to bottom surface 105 of bottom cylinder cap 27. A pair of polarized magnet discs 108, 109 are mounted at 90° to one another to provide a magnetic field having a magnetic field of constant variation for abduction angle sensor 100 and flexion angle sensor 102, as shown in FIG. 9C. Legs 106 extend from bottom cylinder cap 27. Magnetic disc 108 is coupled by axle 104 to legs 106 of bottom cylinder cap 27 with bearings 107. The axis of magnet disc 108 and the axis of magnet disc 109 intersect at one point $P_2$. Each point around $P_2$ has a determined intensity of the magnetic field which is independent of motion of cylinder body 24. Abduction angle sensor 100 and flexion angle sensor 102 measure the magnetic field of magnetic discs 108 and 109. For example, abduction angle sensor 100 and flexion angle sensor 102 can be Hall effect sensors which sense magnetic fields. Abduction angle sensor 100 measures abduction rotation of about 60 degrees from about −30 degrees to about 30 degrees. Flexion angle sensor 102 measures flexion rotation of about 120 degrees from about 10 degrees to about 110 degrees.

Figure 10:
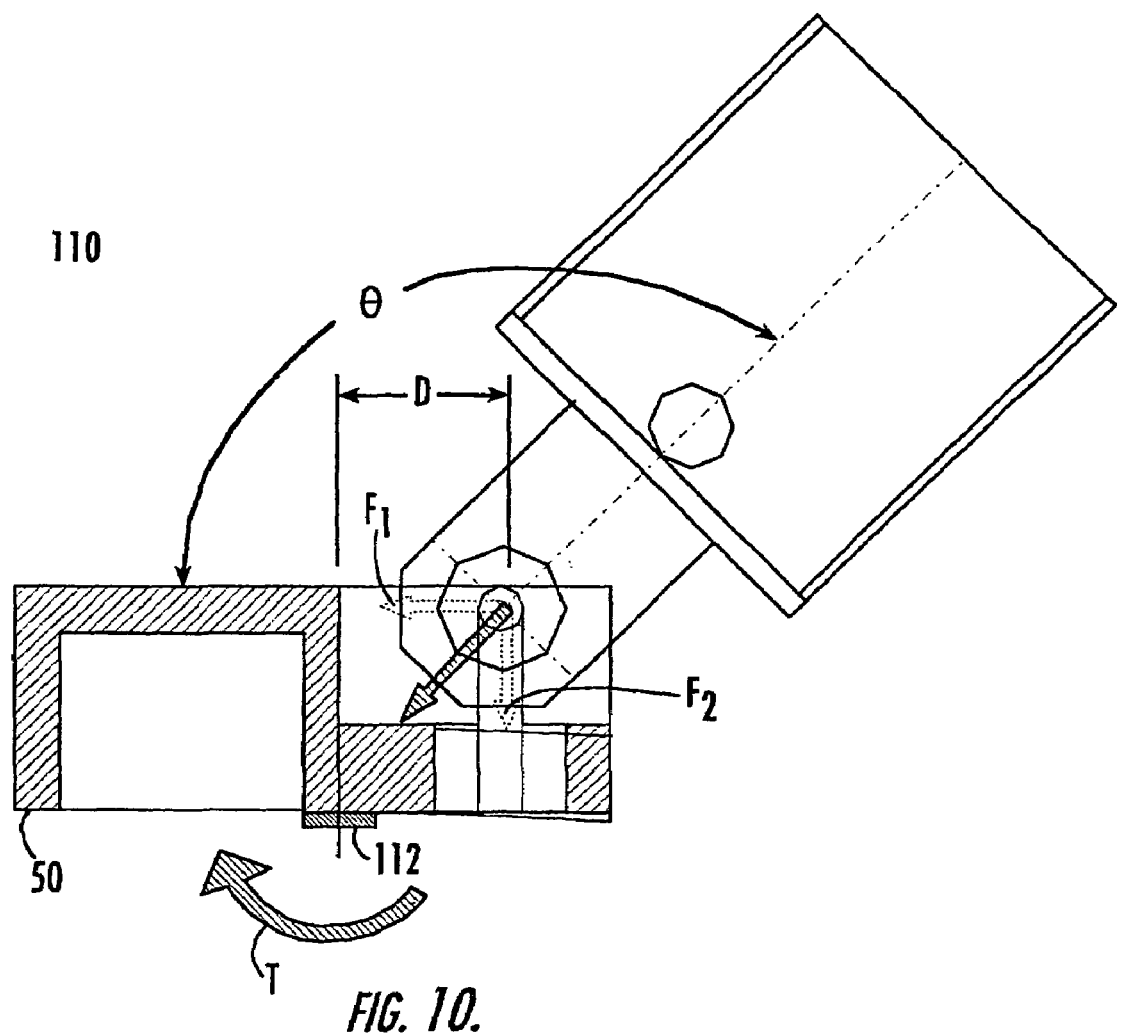
FIG. 10 is a schematic diagram of a force sensor used in the system.

Force sensor 110 measures forces applied by fingertip joint 58, as shown in FIG. 10. Force sensor 110 comprises strain gauge 112 positioned on portion 114 of palm base 50 adjacent to respective rotatably mounted actuators 22a–22d. Fingertip forces in the direction of arrows $F_1$ and $F_2$ are measured based on the torque value represented by torque T, measured by strain gauge 112, angle θ and distance D.

Figure 11:
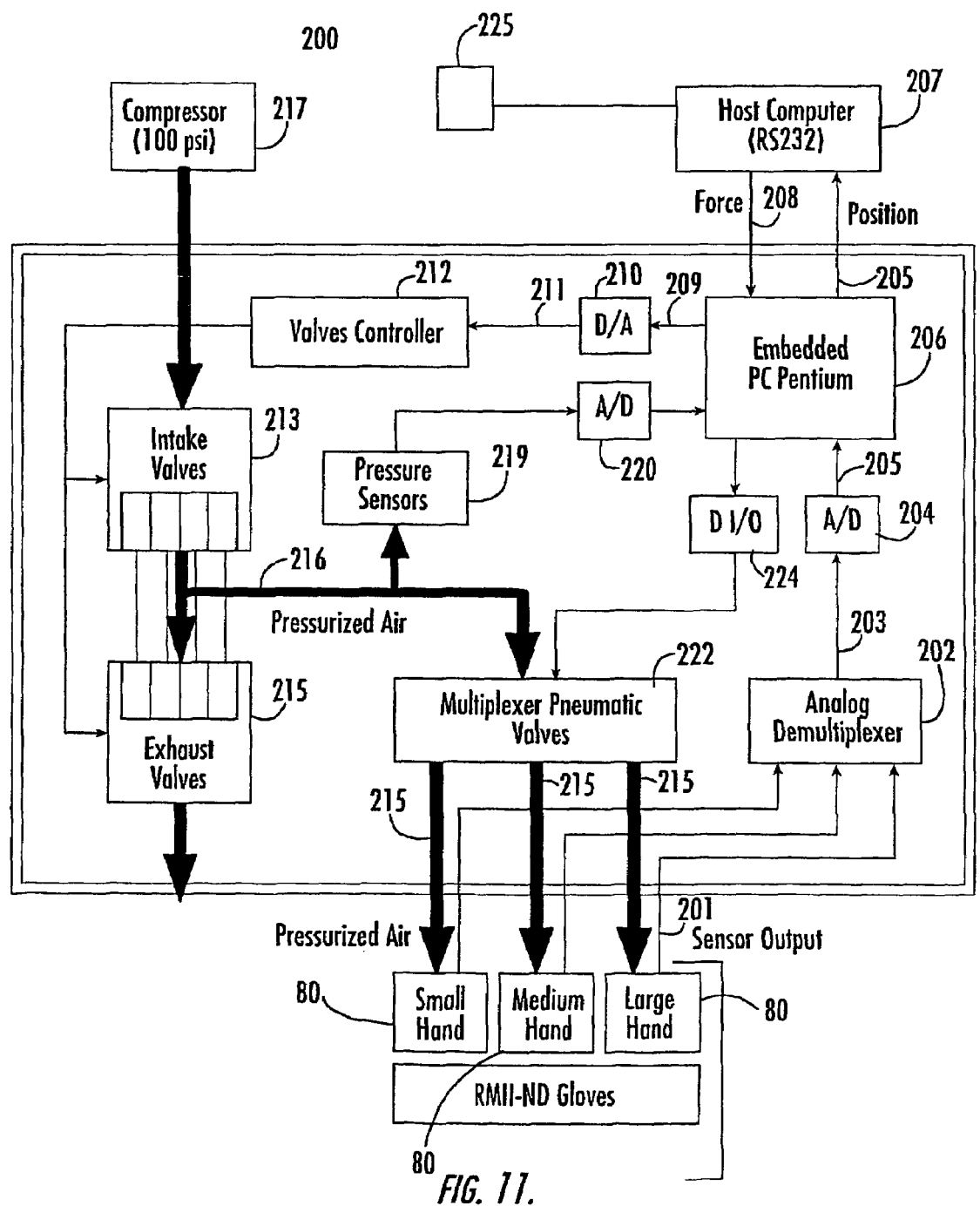
FIG. 11 is a schematic diagram of an interface for use with the actuator of the present invention.

FIG. 11 is a schematic diagram of actuator interface 200. Position signals 201 from sensing system 80 are received at analog demultiplexer 202. Position signals 201 from sensing system 80 can include signals from linear sensor 81, abduction angle sensor 100, flexion angle sensor 102 and force sensor 110 respectively received from actuator 22a–22d of a small hand, a medium hand or a large hand. Analog demultiplexer 202 decouples position signals 201 from sensing system 80. Output signals 203 from analog demultiplexer 202 are converted by analog to digital converter 204 to digital position signals 205. Digital position signals 205 are received at on-board computer 206 and forwarded to host computer 207. Digital signals 205 can be forwarded, for example, over an RS232 connection to host computer 207. For example, on-board computer 206 can be an embedded Pentium PC.

Host computer 207 determines force feedback to be applied to actuators 22a–22d. Force feedback signals 208 generated by host computer 207 are forwarded to on-board computer 206. On-board computer 206 passes valve control signals 209 to digital to analog converter 210. Analog valve control signals 211 are received at valve controller 212. Valve controller 212 controls intake valves 213 and exhaust valves 215 to determine a pressure for pressurized air 216. Air pressure is provided by air compressor 217. Pressurized air 215 is sensed by pressure sensors 218. Pressure output 219 from pressure sensor 218 is converted with analog to digital converter 220 and is received at on-board computer 206. Multiplexer pneumatic valves 222 interface actuators 22a–22d for providing pressurized air 215. Multiplexer pneumatic valves 222 are controlled by on-board computer 206 through I/O port 224. Actuator interface 200 is similar to the interface described in U.S. Pat. No. 5,354,162 hereby incorporated by reference into this application.

Monitor 225 can display a virtual environment simulation, interacting with host computer 207. If complexity of on-board computer 206 is increased host computer 207 can be omitted.

Kinematic transformations are used to transform the desired position of actuators 22a–22d into a position of piston 23 for extending piston rod 38 from outer cylinder 25, as shown in FIGS. 6A and 6B. For example, conventional techniques for inverse kinematic transformations to output the lengths of cylinders or pistons necessary to reach a desired position, such as described in J. E. Dieudone, R. V. Parrish, & R. E. Bardusch, An Actuators Extension Transformation for a Motion Simulator and an Inverse Transformation Applying Newton-Raphson's Method, NASA, 1972 hereby incorporated by reference into this application and for forward kinematics transformations such as described in C. C. Nguyen & F. J. Pooran, Kinematic Analysis and Workspace Determination of a 6 DOF CKCM Robot End-Effector, Journal of mechanical Working Technology, 1989, 00. 283–294, hereby incorporated by reference into this application, can be implemented by host computer 207.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

The invention claimed is:

1. A force feedback and sensing system for placement in a hand comprising: one or more actuator systems each connectable to a respective digit of said hand; said actuator system comprising a piston moveable within a double acting cylinder, said double acting cylinder comprises: an inner cylinder; an outer cylinder; said inner cylinder and said outer cylinder being seated on a bottom cylinder cap; a first inlet formed in a bottom portion of said outer cylinder; and a second inlet formed in said bottom cylinder cap and in communication with said inner cylinder, a palm base positioned on a palm of said hand, said actuator system being rotatably mounted to said palm base for providing two degrees of freedom or rotation of said actuator system; and one or more sensing systems each connectable to a respective one of said actuator systems, wherein air circulated upwardly from said first inlet between an inside surface of said outer cylinder and an outside surface of said inner cylinder an downwardly within said inner cylinder for compressing said piston and air circulated from said second inlet upwardly for extending said piston.

2. The system of claim 1 wherein said inner cylinder is formed of glass.

3. The system of claim 1 wherein said outer cylinder is formed of metal.

4. The system of claim 1 further comprising:
a first gasket positioned between a bottom portion of said inner cylinder and said outer cylinder adjacent said bottom cylinder cap, said first gasket having an aperture in communication with said first inlet.

5. The system of claim 1 further comprising a second gasket positioned between a top portion of said inner cylinder and said outer cylinder, said second gasket having an aperture for receiving said air circulating upwardly from said first inlet between said inside surface of said outer cylinder and said outside surface of said inner cylinder.

6. The system of claim 1 further comprising:
a piston rod coupled to said piston with a spherical joint.

7. The system of claim 6 further comprising:
a shaft guide positioned within a top portion of said inner cylinder, said piston rod sliding within said shaft guide.

8. The system of claim 7 wherein said shaft guide is formed of a material having a low coefficient of friction.

9. The system of claim 8 wherein said shaft guide is formed of a nylon and molybdeum material.

10. The system of claim 1 wherein said piston is formed of a material having a low coefficient of friction.

11. The system of claim 10 wherein said piston is formed of a carbon graphite material.

12. The system of claim 1 wherein said actuator system is mounted with a first joint, said first joint having a pair of bearings wherein each bearing is mounted to said actuator system for providing a first of said two degrees of freedom on a flexion axis.

13. The system of claim 12 wherein said actuator system is mounted with a second joint, said second joint having a pair of bearings wherein each being is mounted to said actuator system for providing a second of said two degrees of freedom in an abduction axis.

14. The system of claim 13 wherein said flexion axis and said abduction axis intersect at a point.

15. The system of claim 1 further comprising:
air tubing connected to said actuator systems, wherein said air tubing is integrally connected to said palm base.

16. The system of claim 1 wherein said palm base has a rounded bottom surface.

17. The system of claim 16 wherein an outer diameter of said bottom surface of said palm base is in a range of about 10 mm to about 20 mm.

18. The system of claim 1 wherein said actuator system is selected from the group comprising a "large" hand having a compression rate of about 54%, a "medium" hand having a compression rate of about 58% and a "small" hand having a compression rate of about 62%.

19. The system of claim 1 wherein said actuator system includes a piston and a piston rod attached to said piston and a sensing system comprises a linear sensor for measuring a distance of said piston rod within said cylinder.

20. The system of claim 19 wherein said linear sensor comprises:
a reflective infrared sensor mounted to said palm base;
one or more infrared emitters attached to a bottom of said cylinder;
one or more infrared receptors attached to a bottom of said cylinder;
fiber optic cables connecting said infrared sensor to said one or more infrared emitters and said one or more infrared receptors; and
a mirror coupled to a bottom surface of said piston, wherein infrared waves generated by said one or more infrared emitters are reflected off said mirror as reflected infrared waves and received at said one or more infrared receptors, said reflected infrared waves being sent to said reflective infrared sensors over said fiber optic cables, values of said reflected waves being used to determine a position of said piston rod.

21. The system of claim 20 wherein said linear sensor comprises two infrared receptors.

22. The system of claim 1 wherein said sensing system comprises an abduction angle sensor for measuring rotation on an abduction axis and a flexion angle sensor for measuring rotation on a flexion axis.

23. The system of claim 1 wherein said sensing system comprises a force sensor for measuring forces applied to a fingertip joint of said digit.

24. The system of claim 1 wherein said palm base is attached to a glove, said glove being received over said hand.

25. The system of claim 1 wherein said palm base is attached to said hand with a hand mount, said hand mount including one or more side mounts attached to a hand mount base, wherein said hand is received between a bottom surface of said palm base and a top surface of said hand mount base.

26. The system of claim 25 wherein said hand mount includes one or more apertures for receiving an attachment to a wrist position sensor.

27. A force feedback and sensing system for placement in a hand comprising:
one or more actuator systems each connectable to a respective digit of said hand;
said actuator system comprising a piston moveable within a double acting cylinder, said actuator system is connected to said respective digit with a fingertip mount, said fingertip mount including one or more side mounts attached to a fingertip mount base, said side mounts slide over said digit and said fingertip mount base being attached adjacent a bottom surface of a fingertip joint of said digit a palm base positioned on a palm of said hand, said actuator system being rotatable mounted to said palm base for providing two degrees of freedom of rotation of said actuator system; and
one or more sensing systems each connectable to a respective one of said actuator systems wherein said side mounts are attached with a self-locking head to said fingertip mount base.

28. The system of claim 27 wherein said actuator system includes a piston and a piston rod attached to said piston, said piston rod being rotatably mounted with a joint to said fingertip mount.

29. The system of claim 28 wherein said joint includes a pair of bearings.

30. A force feedback and sensing system for placement in a hand comprising:
one or more actuator systems each connectable to a respective digit of said hand;
said actuator system comprising a piston moveable within a double acting cylinder, a palm base positioned on a palm of said hand, said actuator system being rotatably mounted to said palm base for providing two degrees of freedom of rotation of said actuator system, said actuator system includes a piston and a piston rod attached to said piston and a sensing system comprises a linear sensor for measuring a distance of said piston rod within said cylinder, said linear sensor comprises: a reflective infrared sensor mounted to said palm base;
one or more infrared emitters attached to a bottom of said cylinder;

one or more infrared receptors attached to a bottom of said cylinder;

fiber optic cables connecting said infrared sensor to said one or more infrared emitters and said one or more infrared receptors; and a mirror coupled to a bottom surface of said piston, wherein infrared waves generated by said one or more infrared emitters are reflected off said mirror as reflected infrared waves and received at said one or more infrared receptors, said reflected infrared waves being sent to said reflective infrared sensors over said fiber optic cables, values of said reflected waves being used to determine a position of said piston rod and wherein said actuator system comprises an inner cylinder within an outer cylinder, said infrared emitter and said infrared receptor being positioned at said bottom of said inner cylinder, a cover positioned on the outer portion of said inner cylinder, said cover being formed of a reflective material and an absorbing material, a surface of said reflective material increasing progressively from a bottom portion to a top portion of said inner cylinder and a surface of said absorbing material decreasing progressively from said bottom portion to said top portion of said inner cylinder, wherein said infrared waves generated by said one or more infrared emitters are reflected off said mirror and said inner cylinder to said one or more infrared receptors.

31. A force feedback and sensing system for placement in a hand comprising:

one or more actuator systems each connectable to a respective digit of said hand;

said actuator system comprising a piston moveable within a double acting cylinder, a palm base positioned on a palm of said hand, said actuator system being rotatably mounted to said palm base for providing two degrees of freedom of rotation of said actuator system; and one or more sensing systems each connectable to a respective one of said actuator systems said sensing system comprises an abduction angle sensor for measuring rotation on an abduction axis and a flexion angle sensor for measuring rotation on a flexion axis wherein said abduction angle sensor is mounted to said palm base and said flexion angle sensor comprises a pair of polarized magnetic discs forming a magnetic field with a constant variation of intensity, said abduction angle sensor and said flexion angle sensor measuring said intensity of said magnetic field.

32. A force feedback and sensing system for placement in a hand comprising:

one or more actuator systems each connectable to a respective digit of said hand;

said actuator system comprising a piston moveable within a double acting cylinder, a palm base positioned on a palm of said hand, said actuator system being rotatably mounted to said palm base for providing two degrees of freedom of rotation of said actuator system;

and said palm base is attached to said hand with a hand mount, said hand mount including one or more side mounts attached to a hand mount base, wherein said hand is received between a bottom surface of said palm base and a top surface of said hand mount base and wherein said side mounts are attached with a self-locking head to said hand mount base.

33. A method for providing force feedback to a hand comprising:

providing one or more actuator systems each connectable to a respective digit of said hand;

said actuator system comprising a piston moveable within a double acting cylinder;

said double acting cylinder comprises:

an inner cylinder;

an outer cylinder;

said inner cylinder and said outer cylinder being seated on a bottom cylinder cap;

a first inlet formed in a bottom portion of said outer cylinder; and a second inlet formed in said bottom cylinder cap and in communication with said inner cylinder;

a palm base positioned on a palm of said hand, said actuator system being rotatably mounted to said palm base for providing two degrees of freedom of rotation of said actuator system; and sensing a position of said hand with one or more sensing systems each connectable to a respective one of said actuator systems, wherein air circulates upwardly from said first inlet between an inside surface of said outer cylinder and an outside surface of said inner cylinder and downwardly within said inner cylinder for compressing said piston and air circulates from said second inlet upwardly for extending said piston.

* * * * *